United States Patent
Imaoka

(10) Patent No.: US 9,348,125 B2
(45) Date of Patent: May 24, 2016

(54) ZOOM LENS SYSTEM, INTERCHANGEABLE LENS APPARATUS AND CAMERA SYSTEM

(71) Applicant: Panasonic Corporation, Osaka (JP)

(72) Inventor: Takuya Imaoka, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 111 days.

(21) Appl. No.: 14/136,757

(22) Filed: Dec. 20, 2013

(65) Prior Publication Data

US 2014/0211082 A1 Jul. 31, 2014

(30) Foreign Application Priority Data

Jan. 25, 2013 (JP) .................. 2013-011648
Nov. 1, 2013 (JP) .................. 2013-228164

(51) Int. Cl.
*G02B 15/14* (2006.01)
*G02B 15/177* (2006.01)
(Continued)

(52) U.S. Cl.
CPC .............. *G02B 15/177* (2013.01); *G02B 15/22* (2013.01); *G02B 27/646* (2013.01); *G02B 15/14* (2013.01)

(58) Field of Classification Search
CPC ........ G02B 15/00; G02B 15/10; G02B 15/14; G02B 15/15; G02B 15/16; G02B 15/163; G02B 15/177; G02B 15/20; G02B 15/22; H04N 5/232; H04N 5/262
See application file for complete search history.

(56) References Cited

U.S. PATENT DOCUMENTS

| | | | | |
|---|---|---|---|---|
| 7,773,311 B2* | 8/2010 | Endo | .................... | G02B 15/177 359/682 |
| 2004/0125462 A1* | 7/2004 | Misaka | ................ | G02B 15/177 359/684 |
| 2006/0056831 A1* | 3/2006 | Horio | ................. | H04N 5/23209 396/55 |

(Continued)

FOREIGN PATENT DOCUMENTS

| | | | |
|---|---|---|---|
| JP | 2008-233585 A | 10/2008 | |
| JP | 2012-027283 A | 2/2012 | |

(Continued)

*Primary Examiner* — Thong Nguyen
(74) *Attorney, Agent, or Firm* — Pearne & Gordon LLP

(57) ABSTRACT

A zoom lens system comprising: a negative first lens unit including at least one positive lens element; a positive second lens unit including at least one negative lens element; and subsequent lens units including an aperture diaphragm, wherein the subsequent lens units include a most-image-side lens unit fixed to an image surface in focusing, a first focusing lens unit is provided between the aperture diaphragm and the most-image-side lens unit, and the conditions: $1.0 < L_{SW}/\{f_T \times \tan(\omega_T)\} < 2.6$ and $0.8 < L_{G1G2}/f_W < 2.8$ ($L_{SW}$: axial distance from aperture diaphragm to image surface at wide-angle limit, $f_T$: focal length of entire system at telephoto limit, $\omega_T$: half view angle at telephoto limit, $L_{G1G2}$: axial distance between most-image-side lens element in first lens unit and most-object-side lens element in second lens unit at wide-angle limit, $f_W$: focal length of entire system at wide-angle limit) are satisfied.

9 Claims, 24 Drawing Sheets

(51) Int. Cl.
*G02B 15/22* (2006.01)
*G02B 27/64* (2006.01)

(56) References Cited

U.S. PATENT DOCUMENTS

| | | | | |
|---|---|---|---|---|
| 2007/0229972 A1* | 10/2007 | Satori | ............ | G02B 15/177 359/686 |
| 2010/0149406 A1* | 6/2010 | Katakura | ............ | H04N 5/2254 348/345 |
| 2010/0157106 A1* | 6/2010 | Morooka | ............ | G02B 15/177 348/240.3 |
| 2010/0194930 A1* | 8/2010 | Miyazaki | ............ | G02B 15/177 348/240.3 |
| 2012/0019928 A1 | 1/2012 | Sato | | |
| 2012/0069441 A1 | 3/2012 | Fujimoto et al. | | |
| 2013/0162884 A1* | 6/2013 | Tashiro | ............ | G02B 15/14 348/345 |

FOREIGN PATENT DOCUMENTS

| | | |
|---|---|---|
| JP | 2012-068303 A | 4/2012 |
| JP | 2012-083432 A | 4/2012 |

\* cited by examiner

ZOOM LENS SYSTEM, INTERCHANGEABLE LENS APPARATUS AND CAMERA SYSTEM

CROSS-REFERENCE TO RELATED APPLICATION

This application is based on application No. 2013-011648 filed in Japan on Jan. 25, 2013 and application No. 2013-228164 filed in Japan on Nov. 1, 2013, the contents of which are hereby incorporated by reference.

BACKGROUND

1. Field

The present disclosure relates to zoom lens systems, interchangeable lens apparatuses, and camera systems.

2. Description of the Related Art

In recent years, interchangeable-lens type digital camera systems (also referred to simply as "camera systems", hereinafter) have been spreading rapidly. Such interchangeable-lens type digital camera systems realize: taking of high-sensitive and high-quality images; high-speed focusing and high-speed image processing after image taking; and easy replacement of an interchangeable lens apparatus in accordance with a desired scene. Meanwhile, an interchangeable lens apparatus having a zoom lens system that forms an optical image with variable magnification is popular because it allows free change of focal length.

Japanese Laid-Open Patent Publication No. 2012-083432 discloses a zoom lens having a six-unit construction of negative, positive, negative, positive, negative, and positive, in which zooming is performed by moving the first to fifth lens units from a wide-angle limit to a telephoto limit, and focusing is performed by moving the fifth lens unit.

Japanese Laid-Open Patent Publication No. 2008-233585 discloses an optical equipment having a five-unit construction of negative, positive, negative, positive, and positive, in which zooming is performed by moving the first to fourth lens units from a wide-angle limit to a telephoto limit, and focusing is performed by moving an object-side part of the second lens unit.

Japanese Laid-Open Patent Publication No. 2012-068303 discloses an imaging lens having a four-unit construction of negative, positive, negative, and positive, in which zooming is performed by moving the respective lens units from a wide-angle limit to a telephoto limit, and focusing is performed by moving an object-side part of the second lens unit.

SUMMARY

The present disclosure provides a zoom lens system having high optical performance, in which chromatic aberration is sufficiently compensated. Further, the present disclosure provides an interchangeable lens apparatus and a camera system each employing the zoom lens system.

The novel concepts disclosed herein were achieved in order to solve the foregoing problems in the related art, and herein is disclosed:

a zoom lens system having a plurality of lens units, each lens unit comprising at least one lens element, the zoom lens system, in order from an object side to an image side, comprising:

a first lens unit having negative optical power, and including at least one lens element having positive optical power;

a second lens unit having positive optical power, and including at least one lens element having negative optical power; and subsequent lens units including an aperture diaphragm, wherein the subsequent lens units include a most image side lens unit provided closest to the image side, the most image side lens unit being fixed with respect to an image surface in focusing from an infinity in-focus condition to a close-object in-focus condition, a first focusing lens unit that moves along an optical axis in the focusing is provided between the aperture diaphragm and the most image side lens unit, and the following conditions (1) and (2) are satisfied:

$$1.0 < L_{SW}/\{f_T \times \tan(\omega_T)\} < 2.6 \tag{1}$$

$$0.8 < L_{G1G2}/f_W < 2.8 \tag{2}$$

where $L_{SW}$ is an axial distance from the aperture diaphragm to the image surface at a wide-angle limit in an infinity in-focus condition, $f_T$ is a focal length of the zoom lens system at a telephoto limit in the infinity in-focus condition, $\omega_T$ is a half view angle at the telephoto limit in the infinity in-focus condition, $L_{G1G2}$ is an axial distance between a most image side lens element in the first lens unit and a most object side lens element in the second lens unit at the wide-angle limit in the infinity in-focus condition, and $f_W$ is a focal length of the zoom lens system at the wide-angle limit in the infinity in-focus condition.

The novel concepts disclosed herein were achieved in order to solve the foregoing problems in the related art, and herein is disclosed:

an interchangeable lens apparatus comprising:

a zoom lens system; and a lens mount section which is connectable to a camera body including an image sensor for receiving an optical image formed by the zoom lens system and converting the optical image into an electric image signal, wherein the zoom lens system is a zoom lens system having a plurality of lens units, each lens unit comprising at least one lens element, the zoom lens system, in order from an object side to an image side, comprising:

a first lens unit having negative optical power, and including at least one lens element having positive optical power;

a second lens unit having positive optical power, and including at least one lens element having negative optical power; and subsequent lens units including an aperture diaphragm, wherein the subsequent lens units include a most image side lens unit provided closest to the image side, the most image side lens unit being fixed with respect to an image surface in focusing from an infinity in-focus condition to a close-object in-focus condition, a first focusing lens unit that moves along an optical axis in the focusing is provided between the aperture diaphragm and the most image side lens unit, and the following conditions (1) and (2) are satisfied:

$$1.0 < L_{SW}/\{f_T \times \tan(\omega_T)\} < 2.6 \tag{1}$$

$$0.8 < L_{G1G2}/f_W < 2.8 \tag{2}$$

where $L_{SW}$ is an axial distance from the aperture diaphragm to the image surface at a wide-angle limit in an infinity in-focus condition, $f_T$ is a focal length of the zoom lens system at a telephoto limit in the infinity in-focus condition, $\omega_T$ is a half view angle at the telephoto limit in the infinity in-focus condition, $L_{G1G2}$ is an axial distance between a most image side lens element in the first lens unit and a most object side lens element in the second lens unit at the wide-angle limit in the infinity in-focus condition, and $f_W$ is a focal length of the zoom lens system at the wide-angle limit in the infinity in-focus condition.

The novel concepts disclosed herein were achieved in order to solve the foregoing problems in the related art, and herein is disclosed:

a camera system comprising:

an interchangeable lens apparatus including a zoom lens system; and a camera body which is detachably connected to the interchangeable lens apparatus via a camera mount section, and includes an image sensor for receiving an optical image formed by the zoom lens system and converting the optical image into an electric image signal, wherein the zoom lens system is a zoom lens system having a plurality of lens units, each lens unit comprising at least one lens element, the zoom lens system, in order from an object side to an image side, comprising:

a first lens unit having negative optical power, and including at least one lens element having positive optical power;

a second lens unit having positive optical power, and including at least one lens element having negative optical power; and subsequent lens units including an aperture diaphragm, wherein the subsequent lens units include a most image side lens unit provided closest to the image side, the most image side lens unit being fixed with respect to an image surface in focusing from an infinity in-focus condition to a close-object in-focus condition, a first focusing lens unit that moves along an optical axis in the focusing is provided between the aperture diaphragm and the most image side lens unit, and the following conditions (1) and (2) are satisfied:

$$1.0 < L_{SW}/\{f_T \times \tan(\omega_T)\} < 2.6 \quad (1)$$

$$0.8 < L_{G1G2}/f_W < 2.8 \quad (2)$$

where $L_{SW}$ is an axial distance from the aperture diaphragm to the image surface at a wide-angle limit in an infinity in-focus condition, $f_T$ is a focal length of the zoom lens system at a telephoto limit in the infinity in-focus condition, $\omega_T$ is a half view angle at the telephoto limit in the infinity in-focus condition, $L_{G1G2}$ is an axial distance between a most image side lens element in the first lens unit and a most object side lens element in the second lens unit at the wide-angle limit in the infinity in-focus condition, and $f_W$ is a focal length of the zoom lens system at the wide-angle limit in the infinity in-focus condition.

The zoom lens system according to the present disclosure enables sufficient compensation of chromatic aberration, and has high optical performance.

BRIEF DESCRIPTION OF THE DRAWINGS

This and other objects and features of the present disclosure will become clear from the following description, taken in conjunction with the preferred embodiments with reference to the accompanied drawings in which.

DETAILED DESCRIPTION

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicant provides the attached drawings and the following description so that those skilled in the art can fully understand this disclosure. Therefore, the drawings and description are not intended to limit the subject defined by the claims.

(Embodiments 1 to 6)

FIGS. 1, 5, 9, 13, 17, and 21 are lens arrangement diagrams of zoom lens systems according to Embodiments 1 to 6, respectively, and each Fig. shows a zoom lens system in an infinity in-focus condition.

In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). In each Fig., each bent arrow provided between part (a) and part (b) indicates a line obtained by connecting the positions of each lens unit respectively at a wide-angle limit, a middle position and a telephoto limit, in order from the top. In the part between the wide-angle limit and the middle position, and the part between the middle position and the telephoto limit, the positions are connected simply with a straight line, and therefore this line does not indicate actual motion of each lens unit.

Furthermore, in each Fig., an arrow imparted to each lens unit indicates focusing from an infinity in-focus condition to a close-object in-focus condition.

Figure 17:
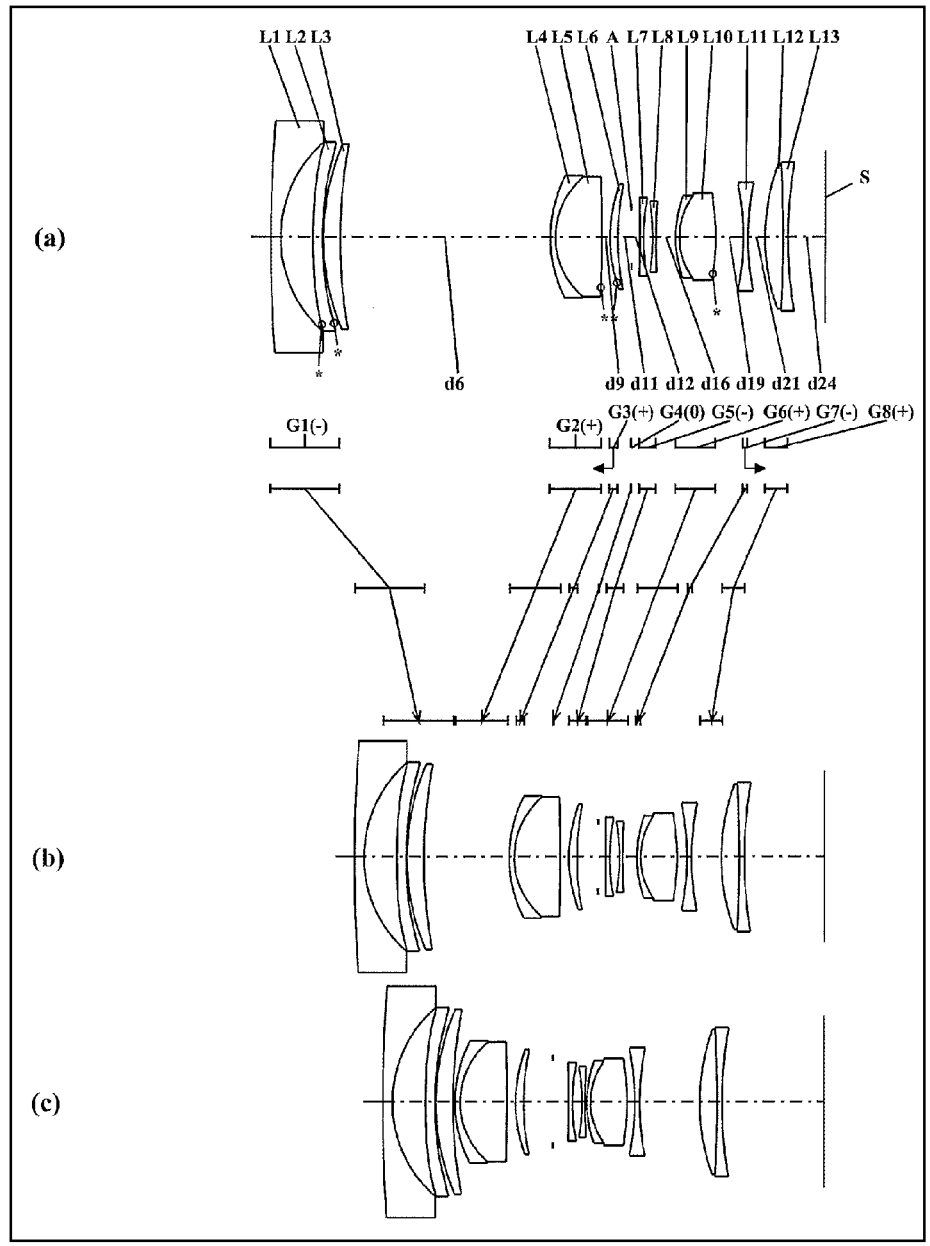
FIG. 17 is a lens arrangement diagram showing an infinity in-focus condition of a zoom lens system according to Embodiment 5 (Numerical Example 5)
Figure 18:
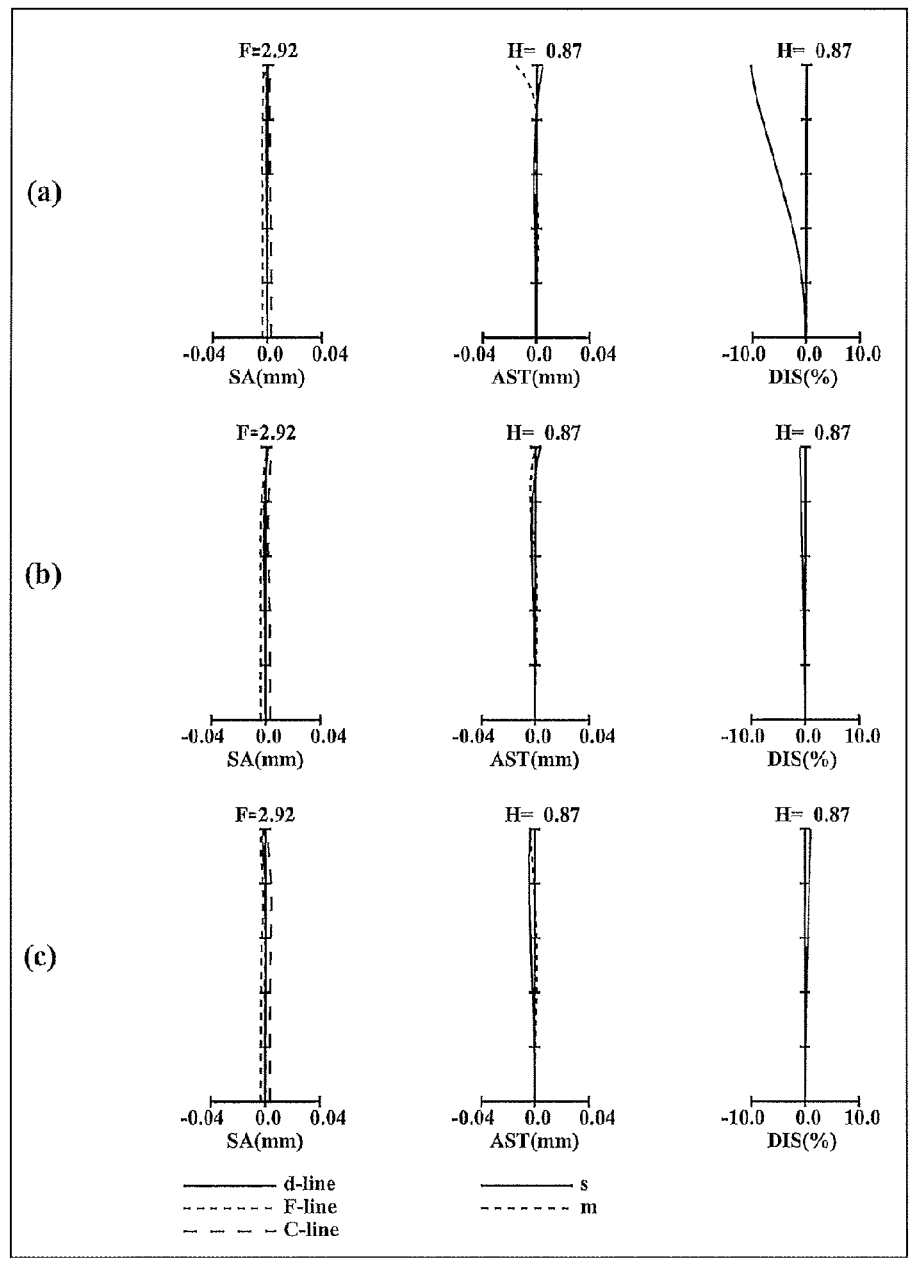
FIG. 18 is a longitudinal aberration diagram of an infinity in-focus condition of the zoom lens system according to Numerical Example 5.
Figure 19:
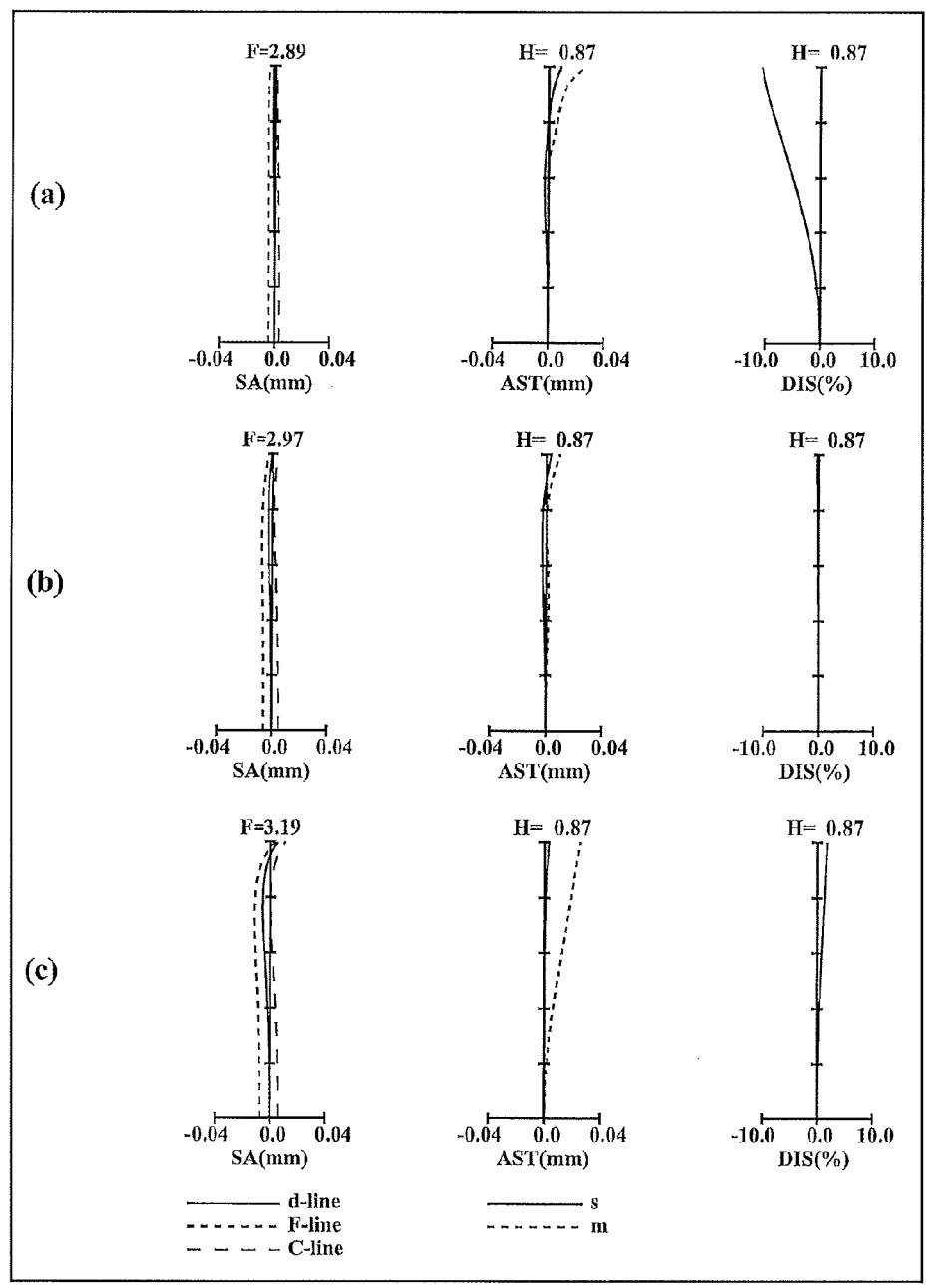
FIG. 19 is a longitudinal aberration diagram of a close-object in-focus condition of the zoom lens system according to Numerical Example 5.
Figure 20:
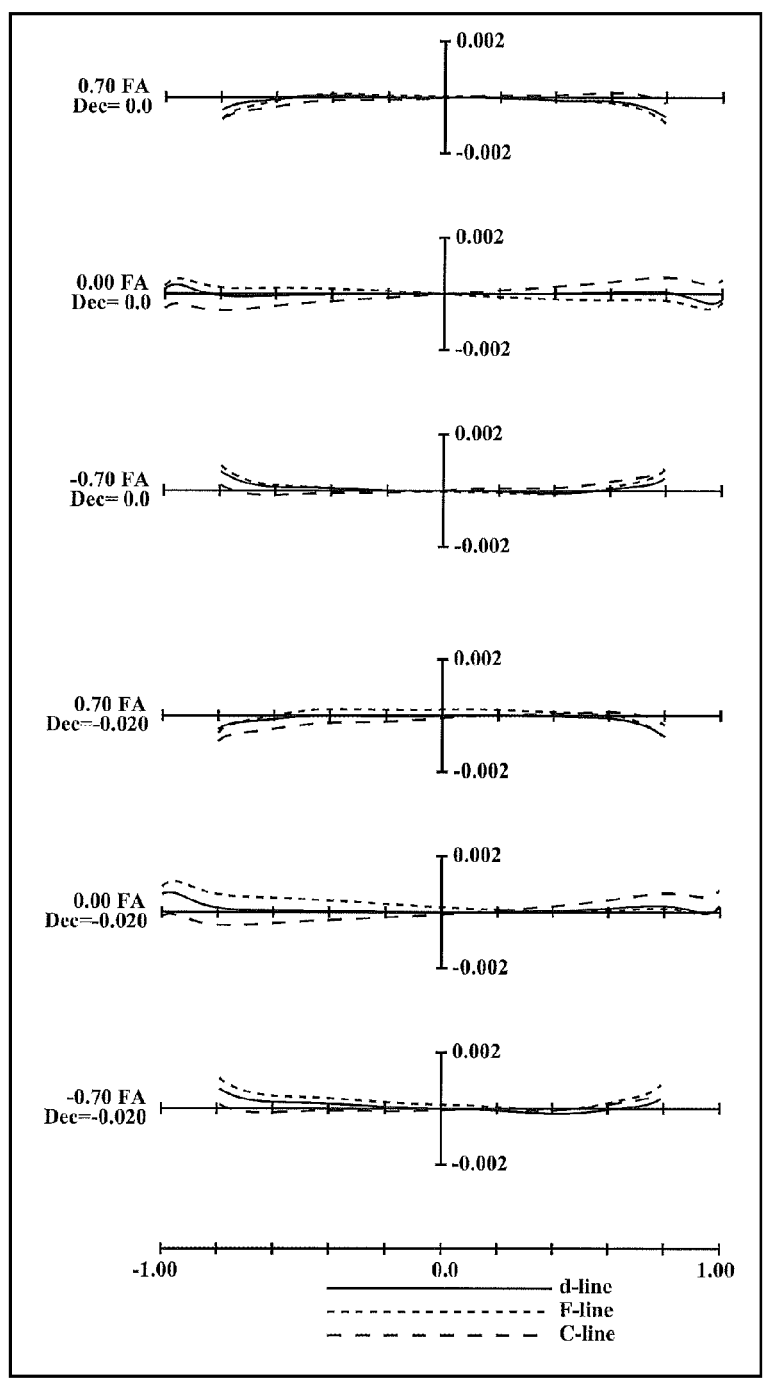
FIG. 20 is a lateral aberration diagram of the zoom lens system according to Numerical Example 5 at a telephoto limit in a basic state where image blur compensation is not performed and in an image blur compensation state.
Figure 21:
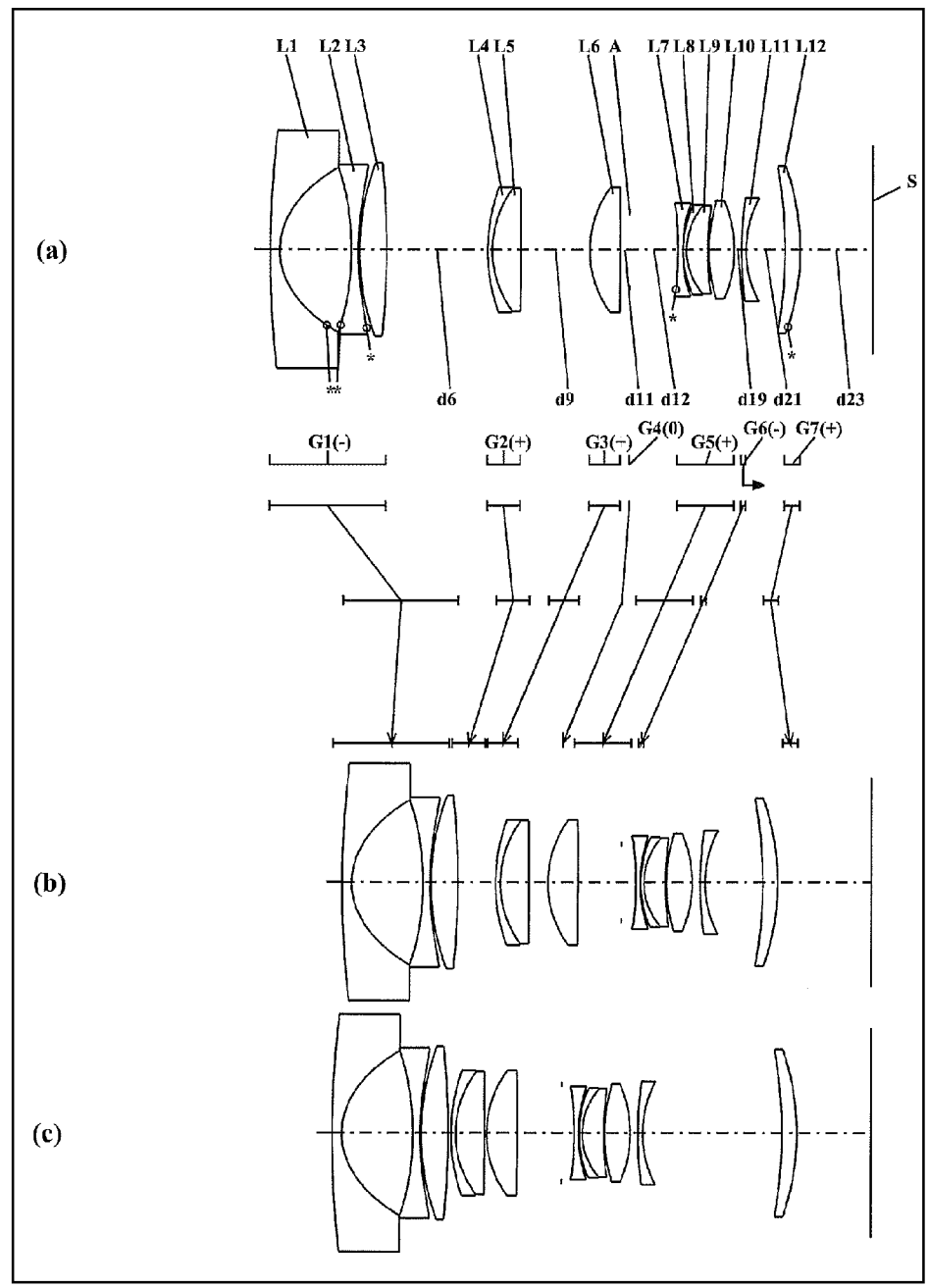
FIG. 21 is a lens arrangement diagram showing an infinity in-focus condition of a zoom lens system according to Embodiment 6 (Numerical Example 6)
Figure 22:
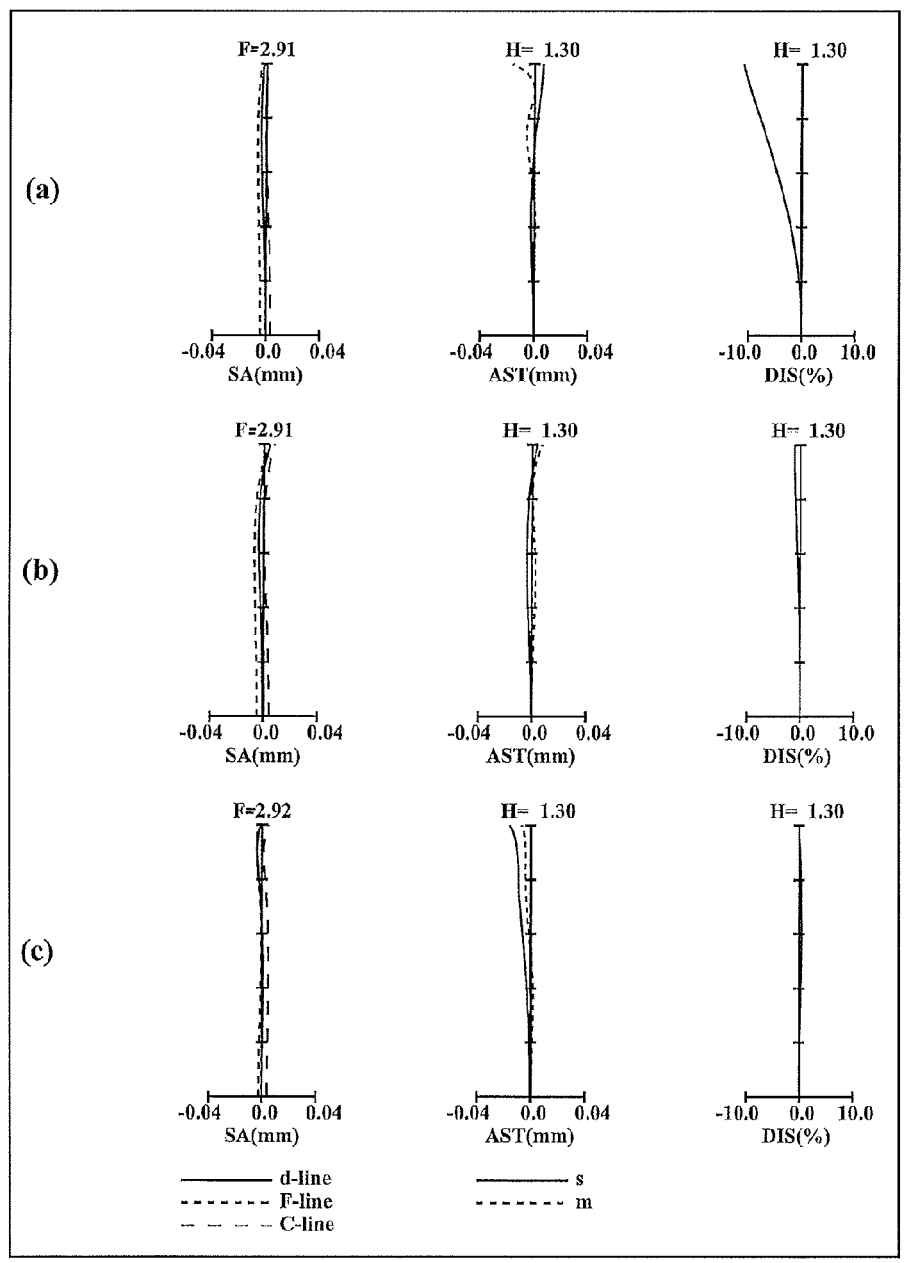
FIG. 22 is a longitudinal aberration diagram of an infinity in-focus condition of the zoom lens system according to Numerical Example 6.
Figure 23:
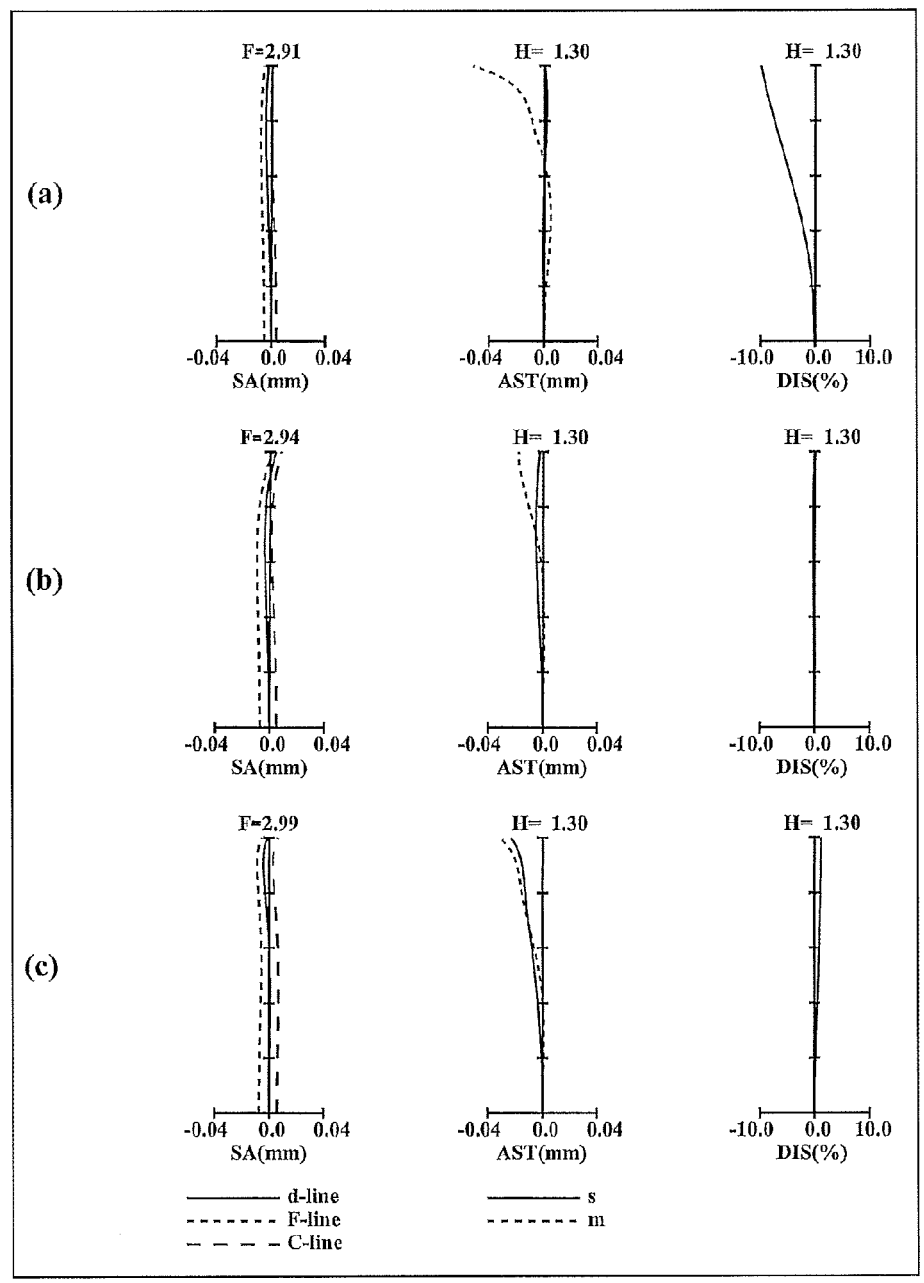
FIG. 23 is a longitudinal aberration diagram of a close-object in-focus condition of the zoom lens system according to Numerical Example 6.

That is, in FIGS. 1, 5, 9, and 13, the arrow indicates a direction in which a third lens unit G3 and a sixth lens unit G6 described later move in focusing from an infinity in-focus condition to a close-object in-focus condition. In FIG. 17, the arrow indicates a direction in which a third lens unit G3 and a seventh lens unit G7 described later move in focusing from an infinity in-focus condition to a close-object in-focus condition. In FIG. 21, the arrow indicates a direction in which a sixth lens unit G6 described later moves in focusing from an infinity in-focus condition to a close-object in-focus condition. In FIGS. 1, 5, 9, 13, 17, and 21, since a reference numeral of each lens unit is shown in part (a), the arrow indicating focusing is given beneath the reference numeral of each lens unit. However, in each zooming state, the direction in which each lens unit moves in focusing will be described later in detail for each embodiment.

Each of the zoom lens systems according to Embodiments 1 to 3, in order from the object side to the image side, comprises: a first lens unit G1 having negative optical power; a second lens unit G2 having positive optical power; a third lens unit G3 having negative optical power; a fourth lens unit G4 having negative optical power; a fifth lens unit G5 having positive optical power; a sixth lens unit G6 having negative optical power; and a seventh lens unit G7 having positive optical power. In the zoom lens systems according to Embodiments 1 to 3, in zooming, the respective lens units individually move along the optical axis such that the intervals between the respective lens units, that is, the interval between the first lens unit G1 and the second lens unit G2, the interval between the second lens unit G2 and the third lens unit G3, the interval between the third lens unit G3 and the fourth lens unit G4, the interval between the fourth lens unit G4 and the fifth lens unit G5, the interval between the fifth lens unit G5 and the sixth lens unit G6, and the interval between the sixth lens unit G6 and the seventh lens unit G7, vary. In the zoom lens systems according to Embodiments 1 to 3, these lens units are arranged in a desired optical power allocation, whereby size reduction of the entire lens system is achieved while maintaining high optical performance.

The zoom lens system according to Embodiment 4, in order from the object side to the image side, comprises: a first lens unit G1 having negative optical power; a second lens unit G2 having positive optical power; a third lens unit G3 having positive optical power; a fourth lens unit G4 having negative optical power; a fifth lens unit G5 having positive optical power; a sixth lens unit G6 having negative optical power; and a seventh lens unit G7 having positive optical power. In the zoom lens system according to Embodiment 4, in zooming, the respective lens units individually move along the optical axis such that the intervals between the respective lens units, that is, the interval between the first lens unit G1 and the second lens unit G2, the interval between the second lens unit G2 and the third lens unit G3, the interval between the third lens unit G3 and the fourth lens unit G4, the interval between the fourth lens unit G4 and the fifth lens unit G5, the interval between the fifth lens unit G5 and the sixth lens unit G6, and the interval between the sixth lens unit G6 and the seventh lens unit G7, vary. In the zoom lens system according to Embodiment 4, these lens units are arranged in a desired optical power allocation, whereby size reduction of the entire lens system is achieved while maintaining high optical performance.

The zoom lens system according to Embodiment 5, in order from the object side to the image side, comprises: a first lens unit G1 having negative optical power; a second lens unit G2 having positive optical power; a third lens unit G3 having positive optical power; a fourth lens unit G4 as an aperture diaphragm A; a fifth lens unit G5 having negative optical power; a sixth lens unit G6 having positive optical power; a seventh lens unit G7 having negative optical power; and an eighth lens unit G8 having positive optical power. In the zoom lens system according to Embodiment 5, in zooming, the respective lens units individually move along the optical axis such that the intervals between the respective lens units, that is, the interval between the first lens unit G1 and the second lens unit G2, the interval between the second lens unit G2 and the third lens unit G3, the interval between the third lens unit G3 and the fourth lens unit G4, the interval between the fourth lens unit G4 and the fifth lens unit G5, the interval between the fifth lens unit G5 and the sixth lens unit G6, the interval between the sixth lens unit G6 and the seventh lens unit G7, and the interval between the seventh lens unit G7 and the eighth lens unit G8, vary. The interval between the second lens unit G2 and the third lens unit G3 does not vary in an infinity in-focus condition. In the zoom lens system according to Embodiment 5, these lens units are arranged in a desired optical power allocation, whereby size reduction of the entire lens system is achieved while maintaining high optical performance.

The zoom lens system according to Embodiment 6, in order from the object side to the image side, comprises: a first lens unit G1 having negative optical power; a second lens unit G2 having positive optical power; a third lens unit G3 having positive optical power; a fourth lens unit G4 as an aperture diaphragm A; a fifth lens unit G5 having positive optical power; a sixth lens unit G6 having negative optical power; and a seventh lens unit G7 having positive optical power. In the zoom lens system according to Embodiment 6, in zooming, the respective lens units individually move along the optical axis such that the intervals between the respective lens units, that is, the interval between the first lens unit G1 and the second lens unit G2, the interval between the second lens unit G2 and the third lens unit G3, the interval between the third lens unit G3 and the fourth lens unit G4, the interval between the fourth lens unit G4 and the fifth lens unit G5, the interval between the fifth lens unit G5 and the sixth lens unit G6, and the interval between the sixth lens unit G6 and the seventh lens unit G7, vary. The third lens unit G3 and the fifth lens unit G5 move with the same locus. In the zoom lens system according to Embodiment 6, these lens units are arranged in a desired optical power allocation, whereby size reduction of the entire lens system is achieved while maintaining high optical performance.

In FIGS. 1, 5, 9, 13, 17, and 21, an asterisk "*" imparted to a particular surface indicates that the surface is aspheric. In each Fig., symbol (+) or (−) imparted to the symbol of each lens unit corresponds to the sign of the optical power of the lens unit. In FIGS. 17 and 21, a lens unit to which symbol (0) is imparted is composed of only an aperture diaphragm A as described later, and therefore, has no optical power. In each Fig., a straight line located on the most right-hand side indicates the position of an image surface S.

Figure 1:
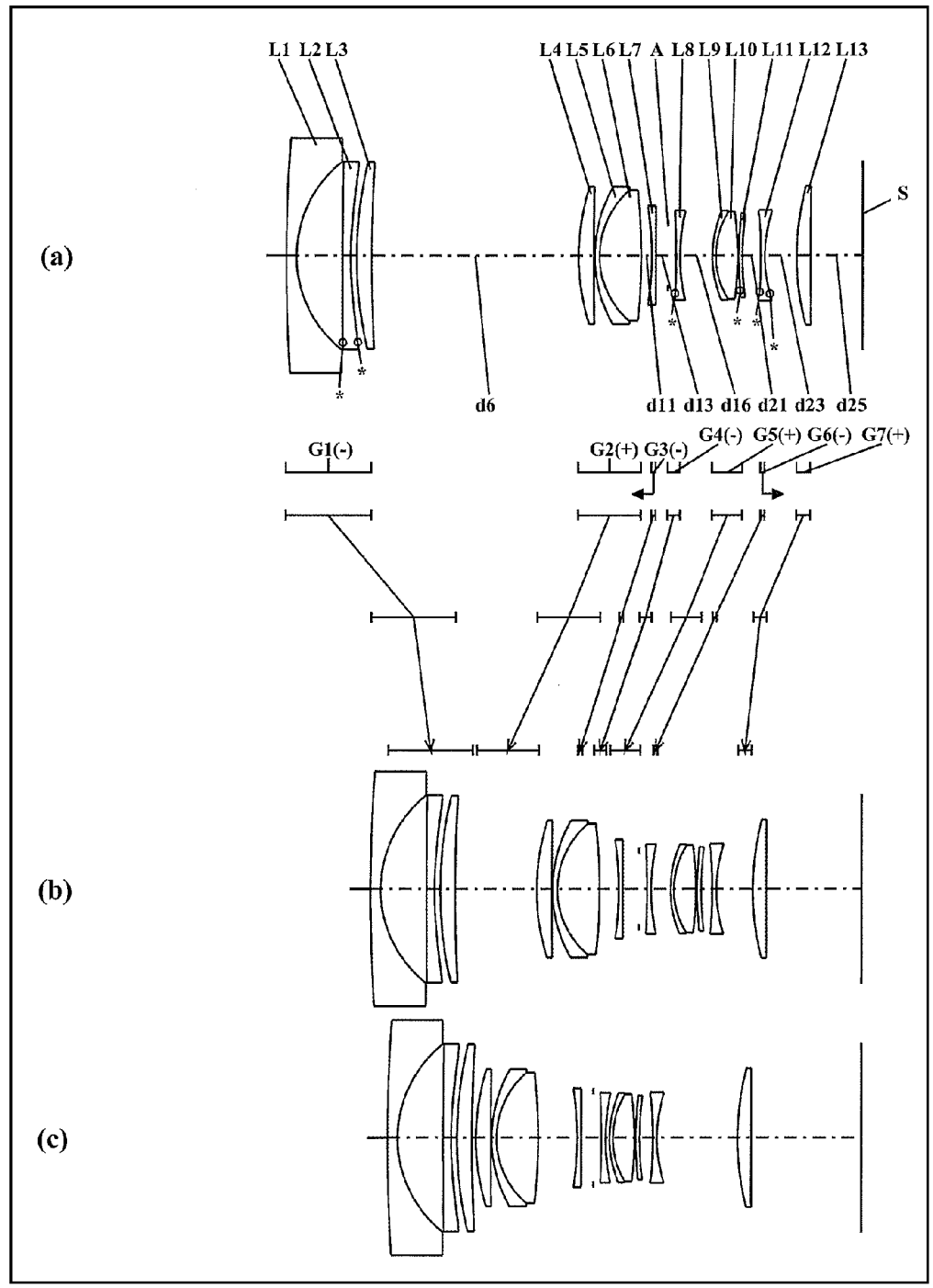
FIG. 1 is a lens arrangement diagram showing an infinity in-focus condition of a zoom lens system according to Embodiment 1 (Numerical Example 1)
Figure 2:
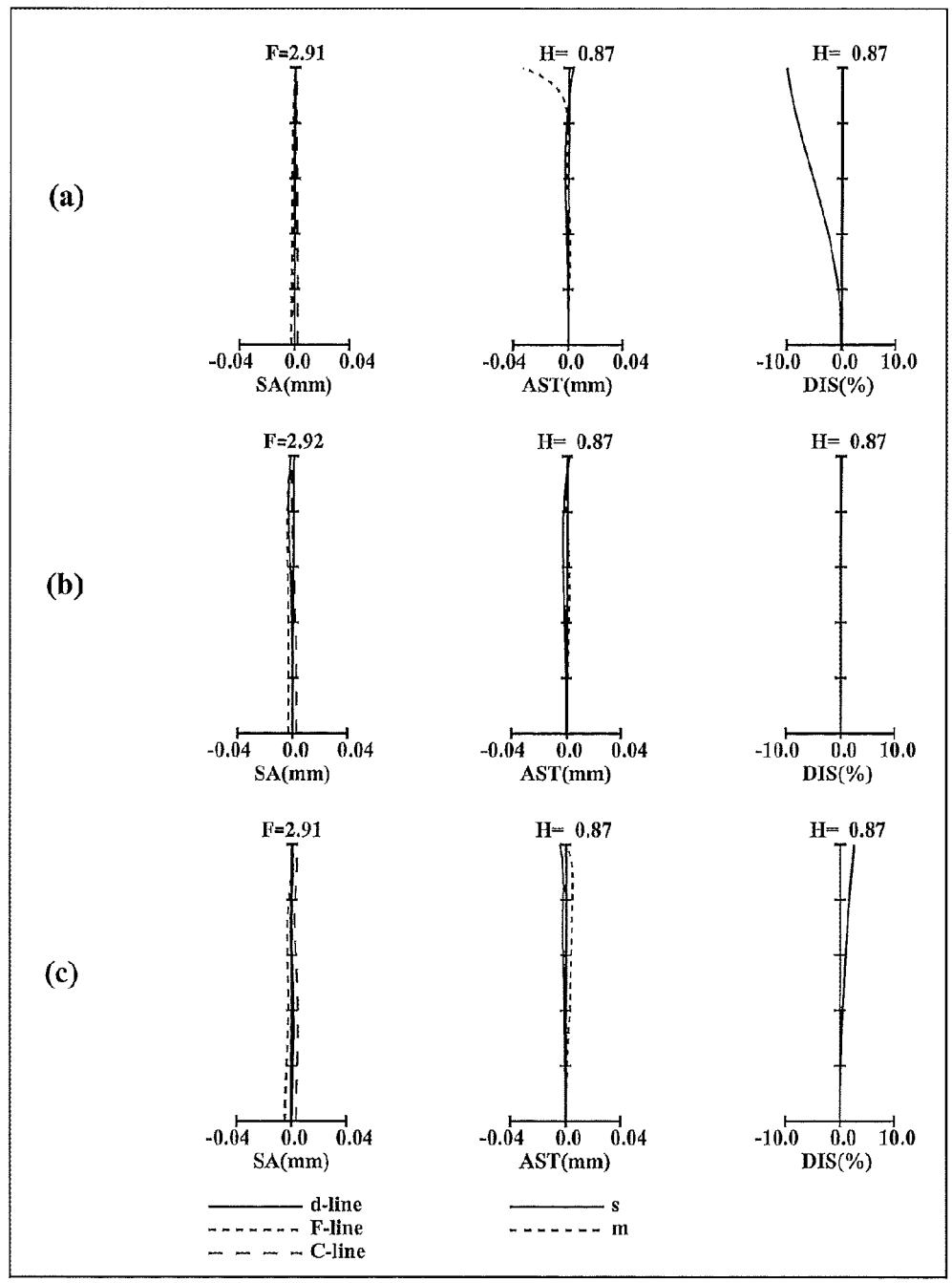
FIG. 2 is a longitudinal aberration diagram of an infinity in-focus condition of the zoom lens system according to Numerical Example 1.
Figure 3:
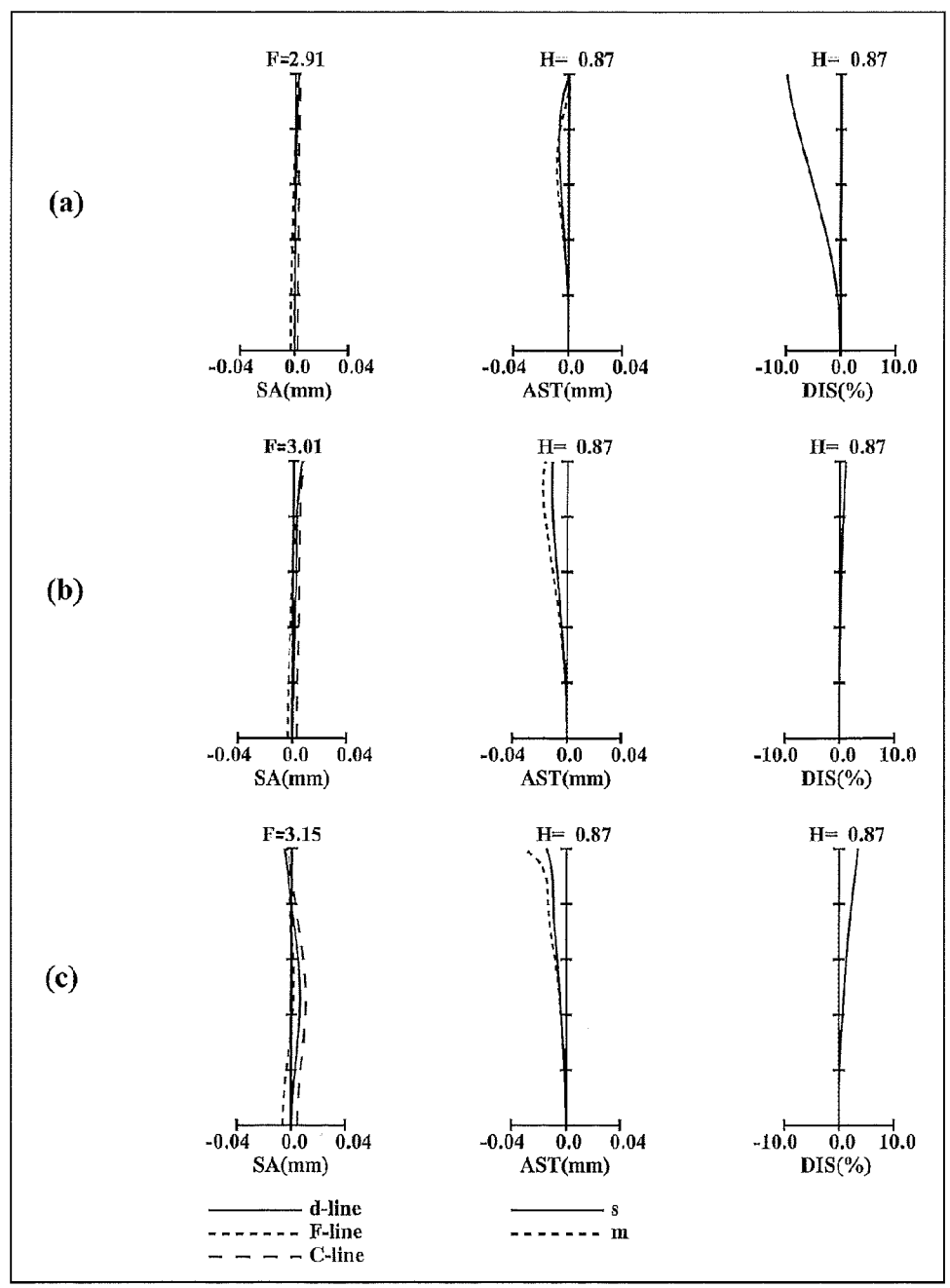
FIG. 3 is a longitudinal aberration diagram of a close-object in-focus condition of the zoom lens system according to Numerical Example 1.
Figure 4:
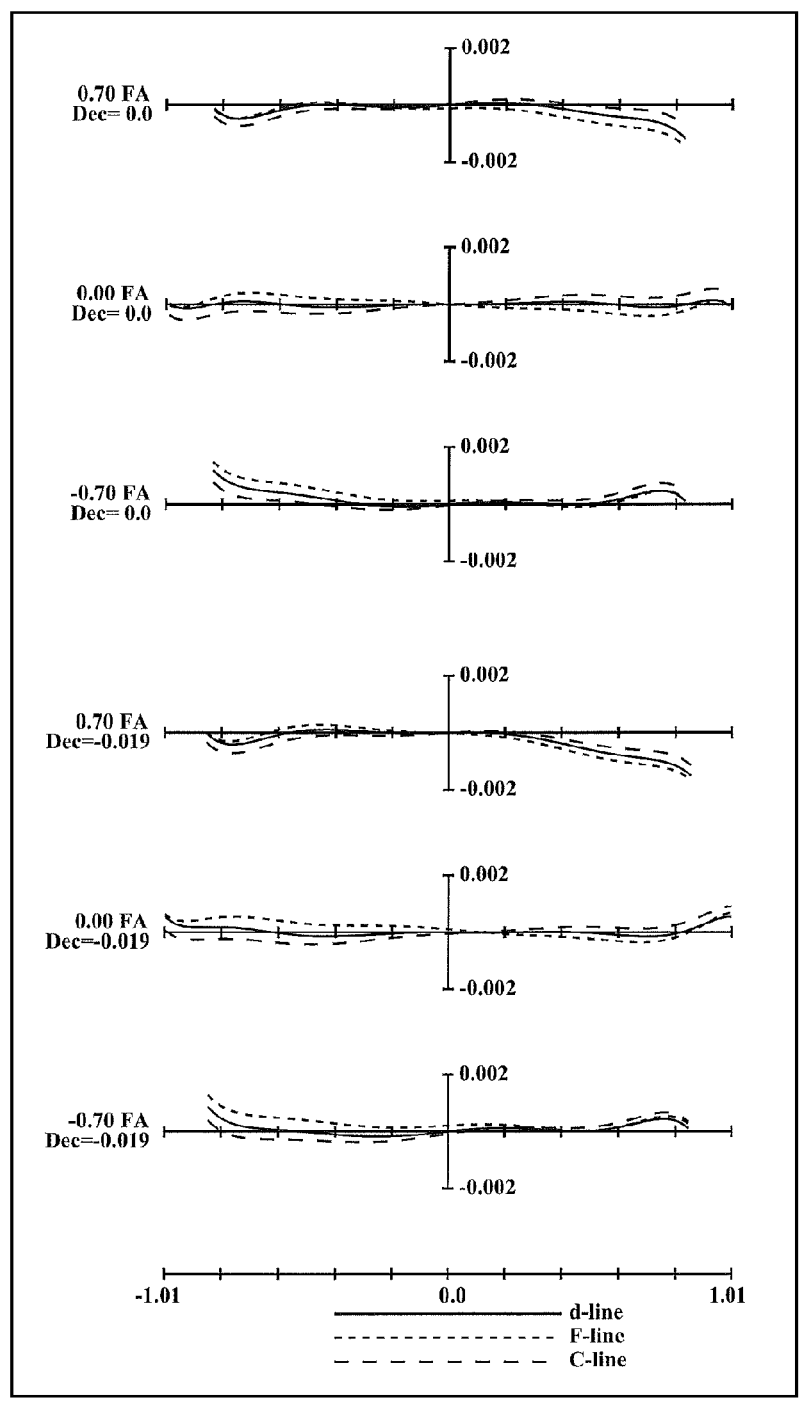
FIG. 4 is a lateral aberration diagram of the zoom lens system according to Numerical Example 1 at a telephoto limit in a basic state where image blur compensation is not performed and in an image blur compensation state.
Figure 5:
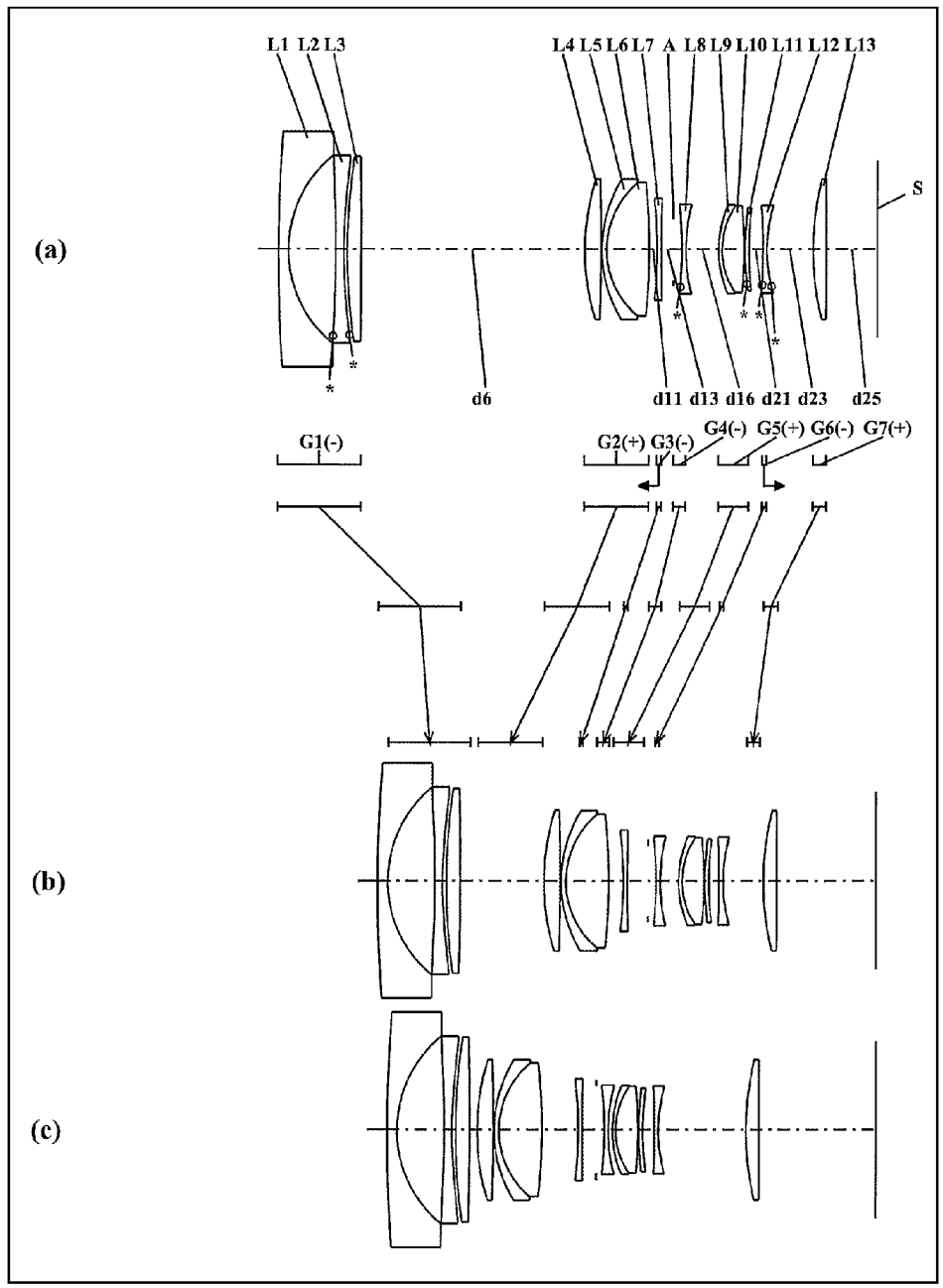
FIG. 5 is a lens arrangement diagram showing an infinity in-focus condition of a zoom lens system according to Embodiment 2 (Numerical Example 2)
Figure 6:
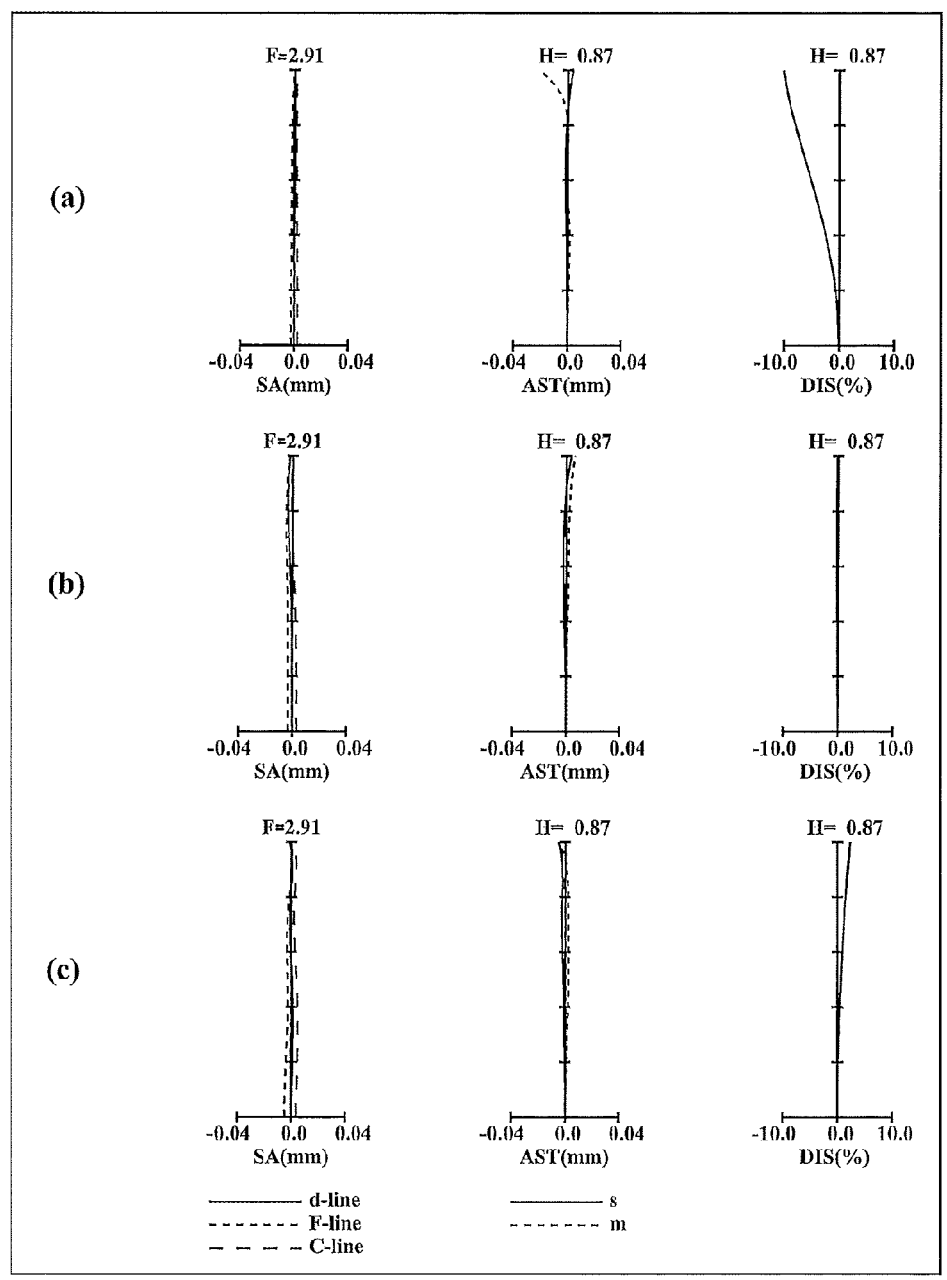
FIG. 6 is a longitudinal aberration diagram of an infinity in-focus condition of the zoom lens system according to Numerical Example 2.
Figure 7:
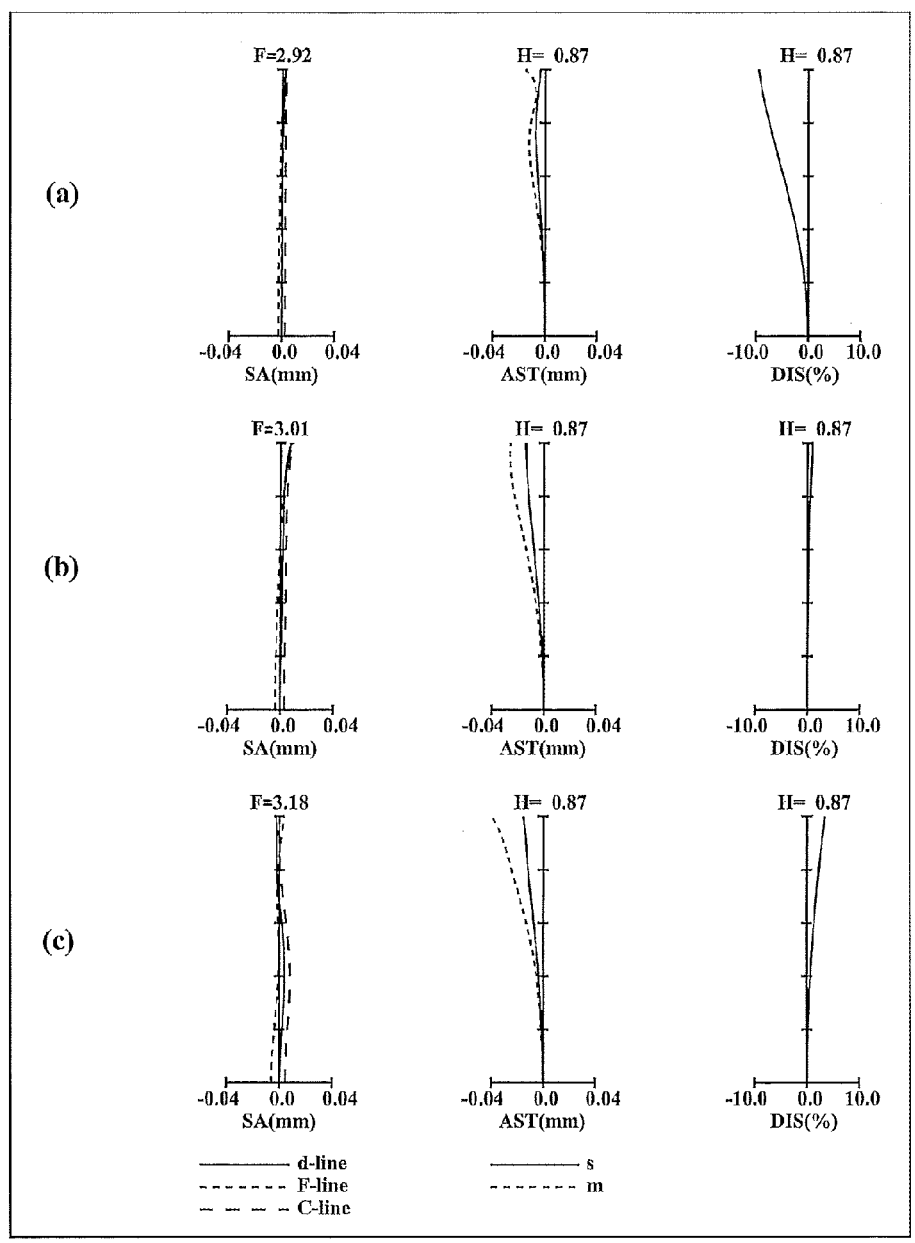
FIG. 7 is a longitudinal aberration diagram of a close-object in-focus condition of the zoom lens system according to Numerical Example 2.
Figure 8:
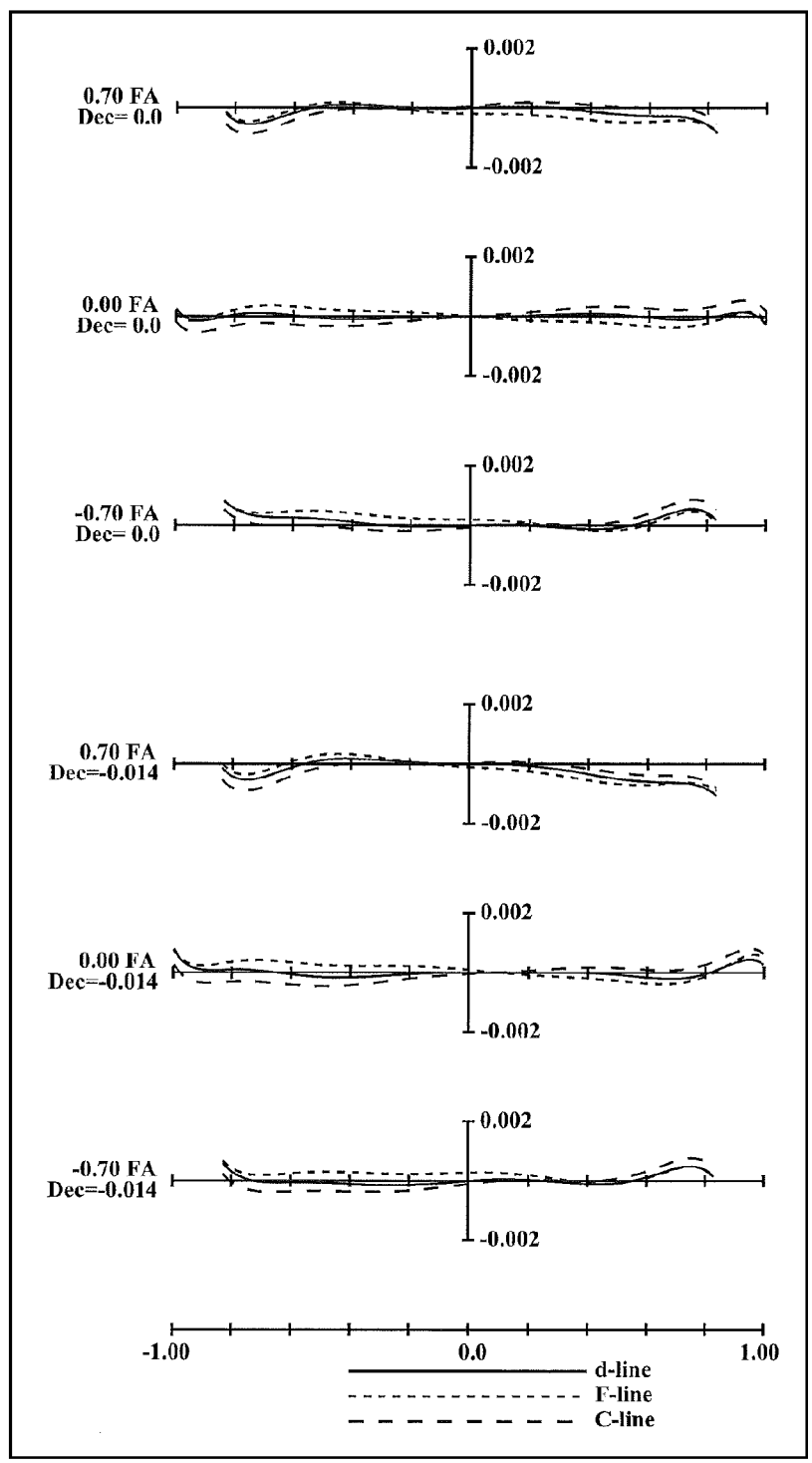
FIG. 8 is a lateral aberration diagram of the zoom lens system according to Numerical Example 2 at a telephoto limit in a basic state where image blur compensation is not performed and in an image blur compensation state.
Figure 9:
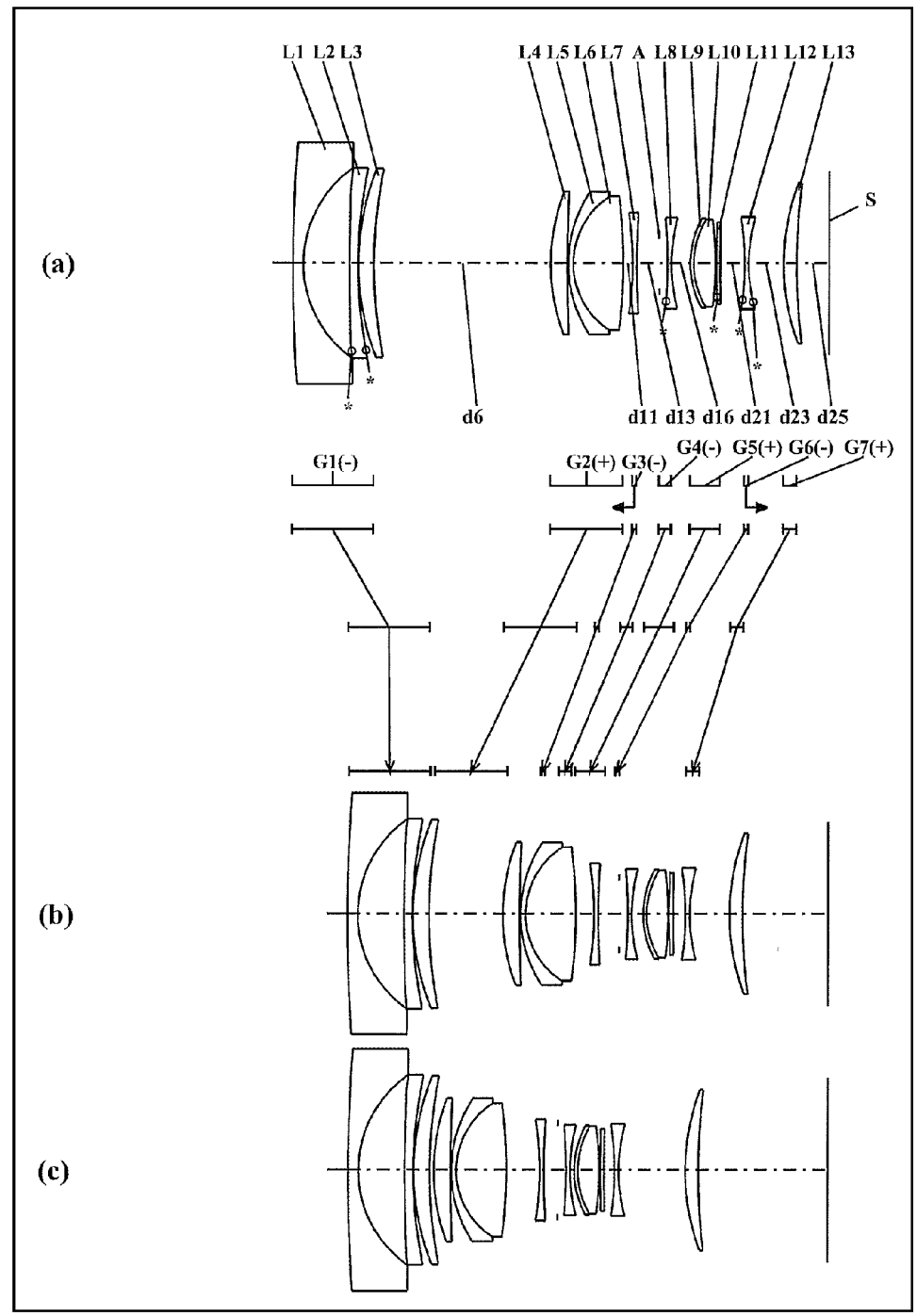
FIG. 9 is a lens arrangement diagram showing an infinity in-focus condition of a zoom lens system according to Embodiment 3 (Numerical Example 3)
Figure 10:
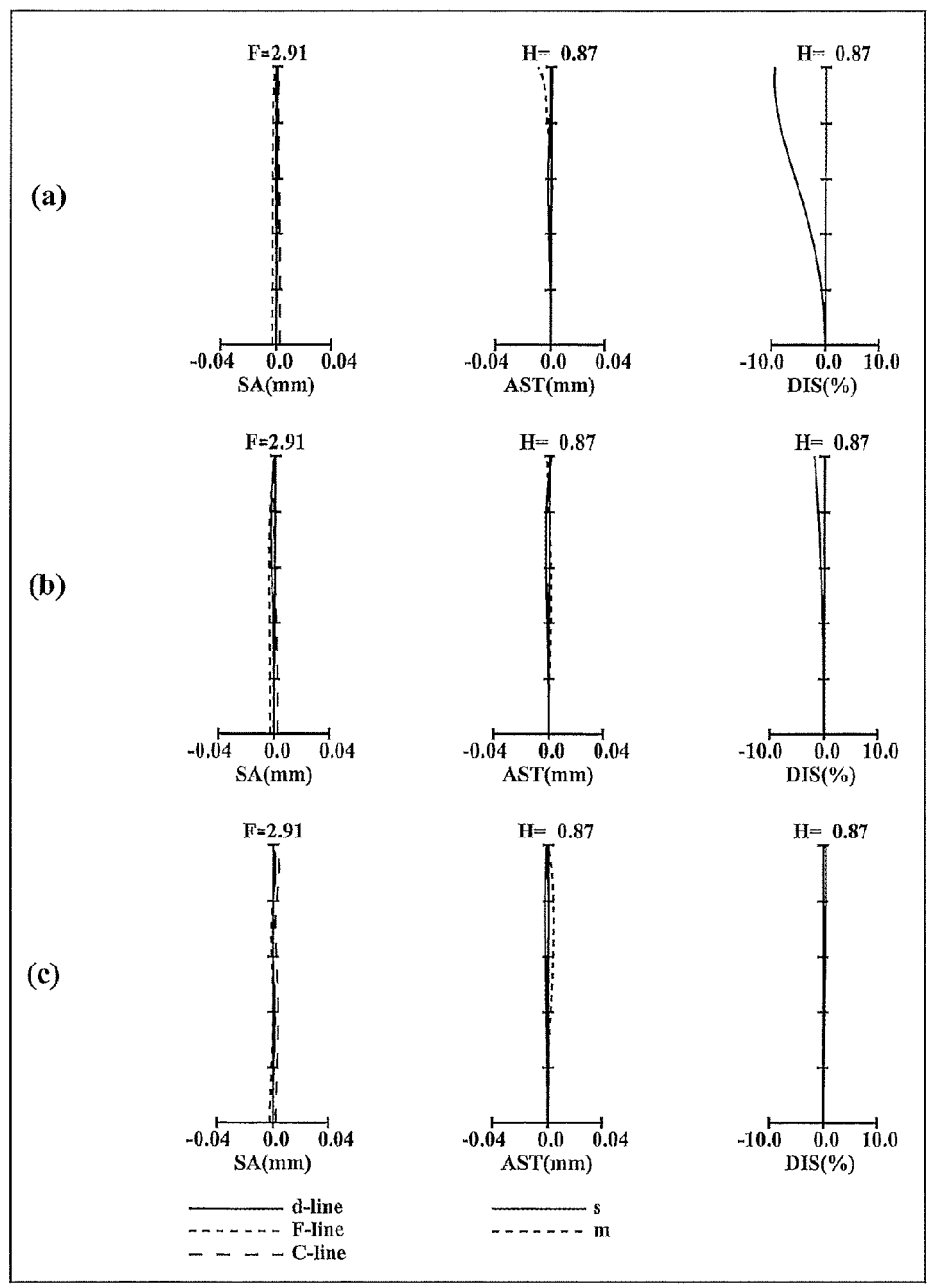
FIG. 10 is a longitudinal aberration diagram of an infinity in-focus condition of the zoom lens system according to Numerical Example 3.
Figure 11:
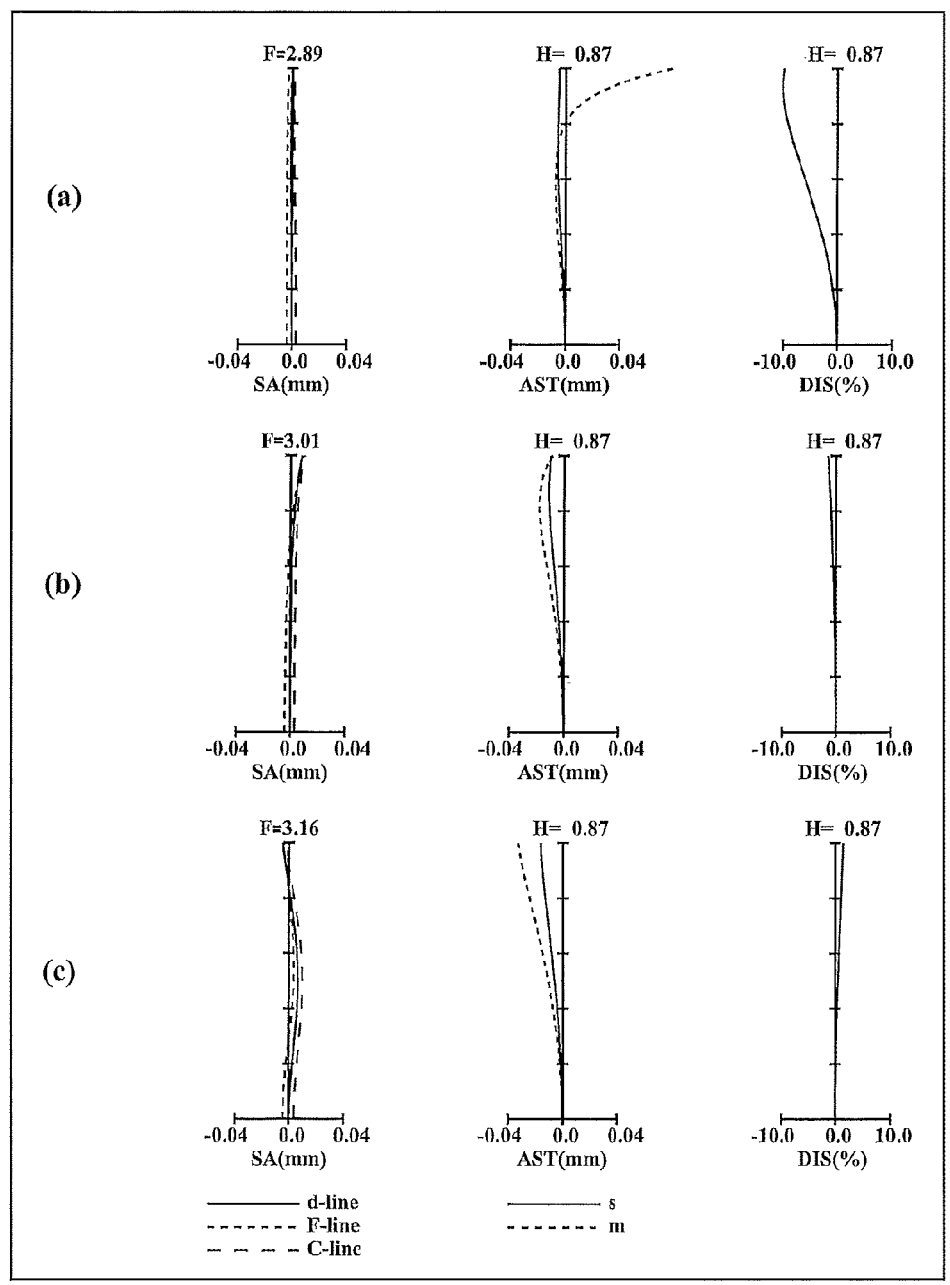
FIG. 11 is a longitudinal aberration diagram of a close-object in-focus condition of the zoom lens system according to Numerical Example 3.
Figure 12:
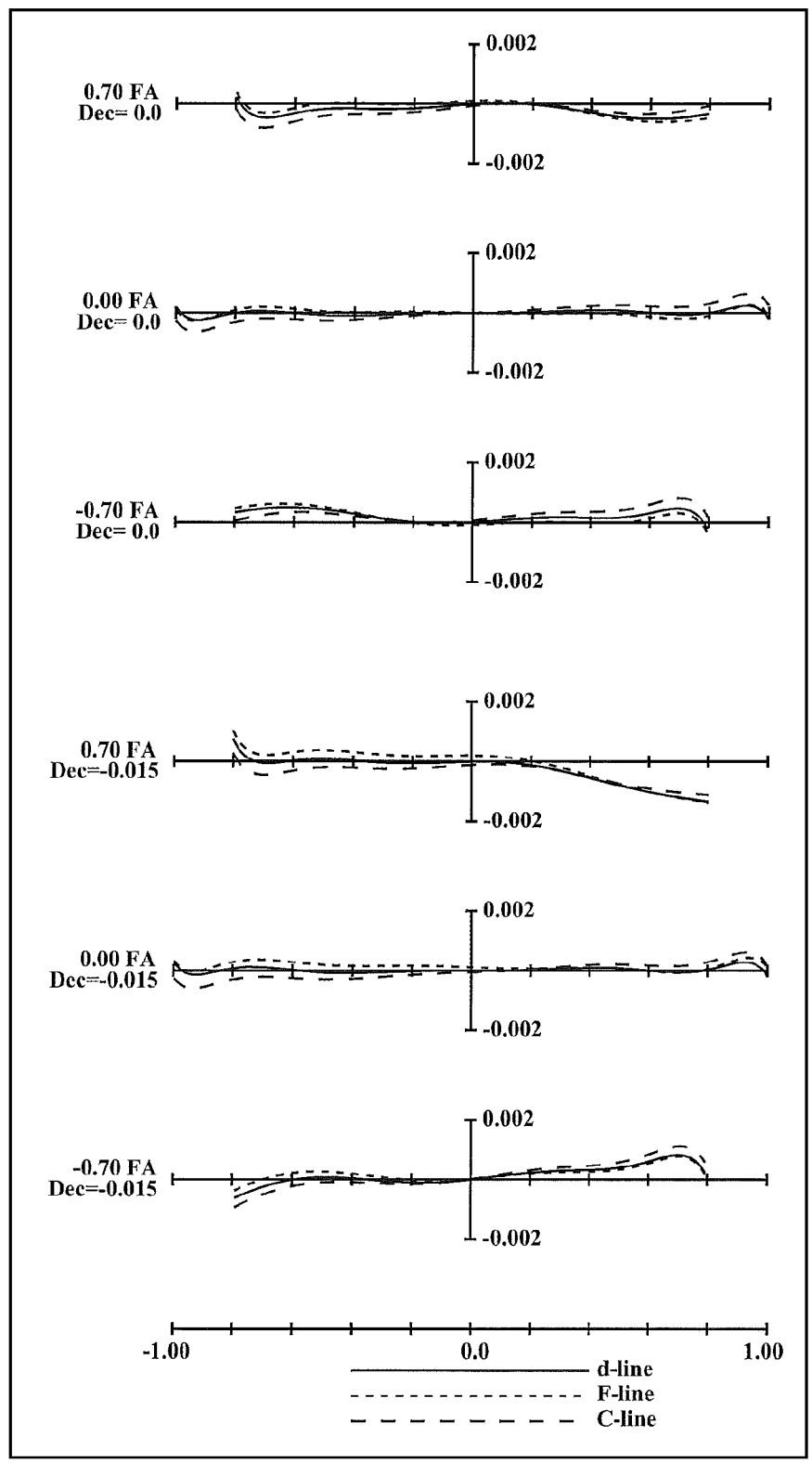
FIG. 12 is a lateral aberration diagram of the zoom lens system according to Numerical Example 3 at a telephoto limit in a basic state where image blur compensation is not performed and in an image blur compensation state.
Figure 13:
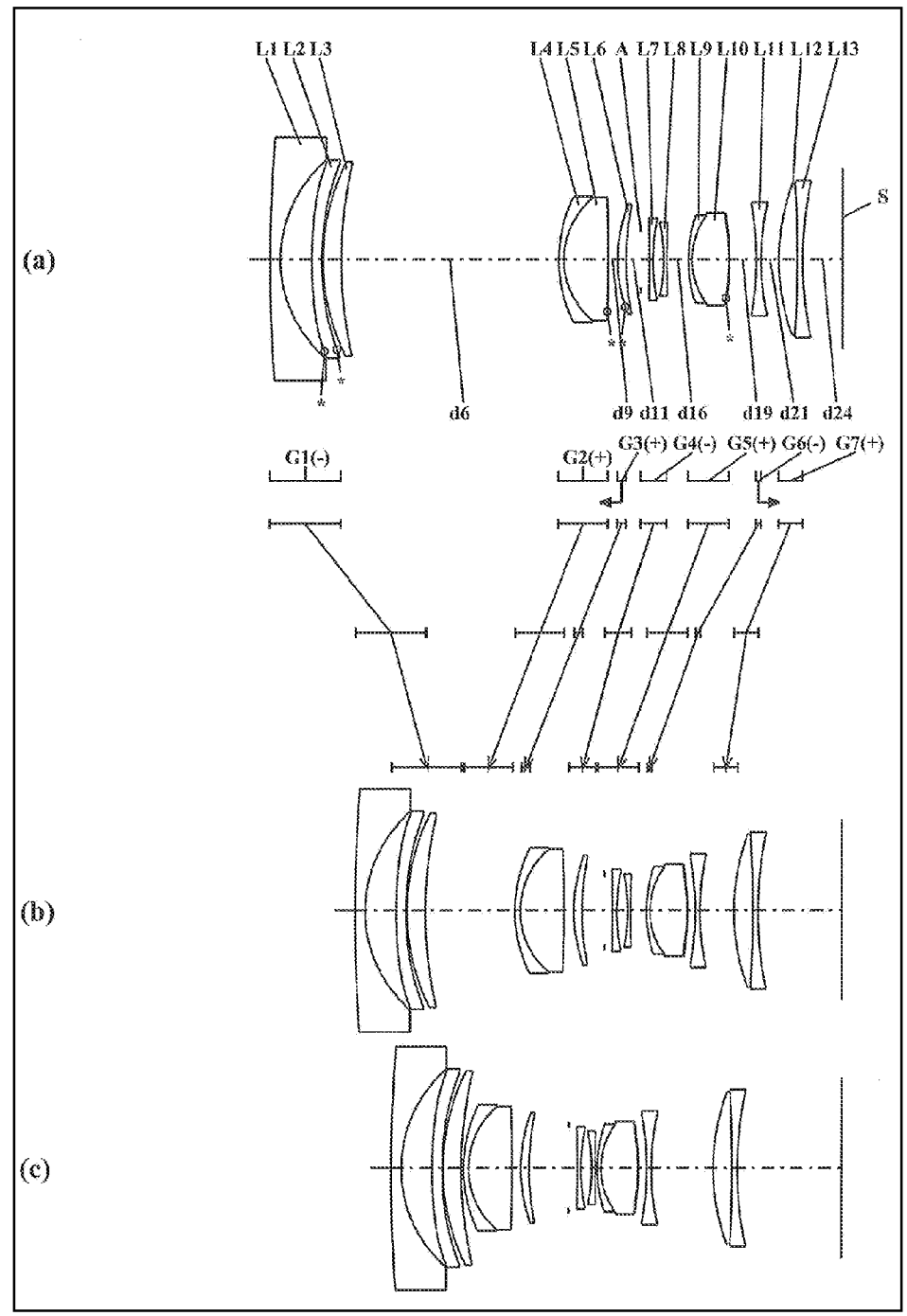
FIG. 13 is a lens arrangement diagram showing an infinity in-focus condition of a zoom lens system according to Embodiment 4 (Numerical Example 4)
Figure 14:
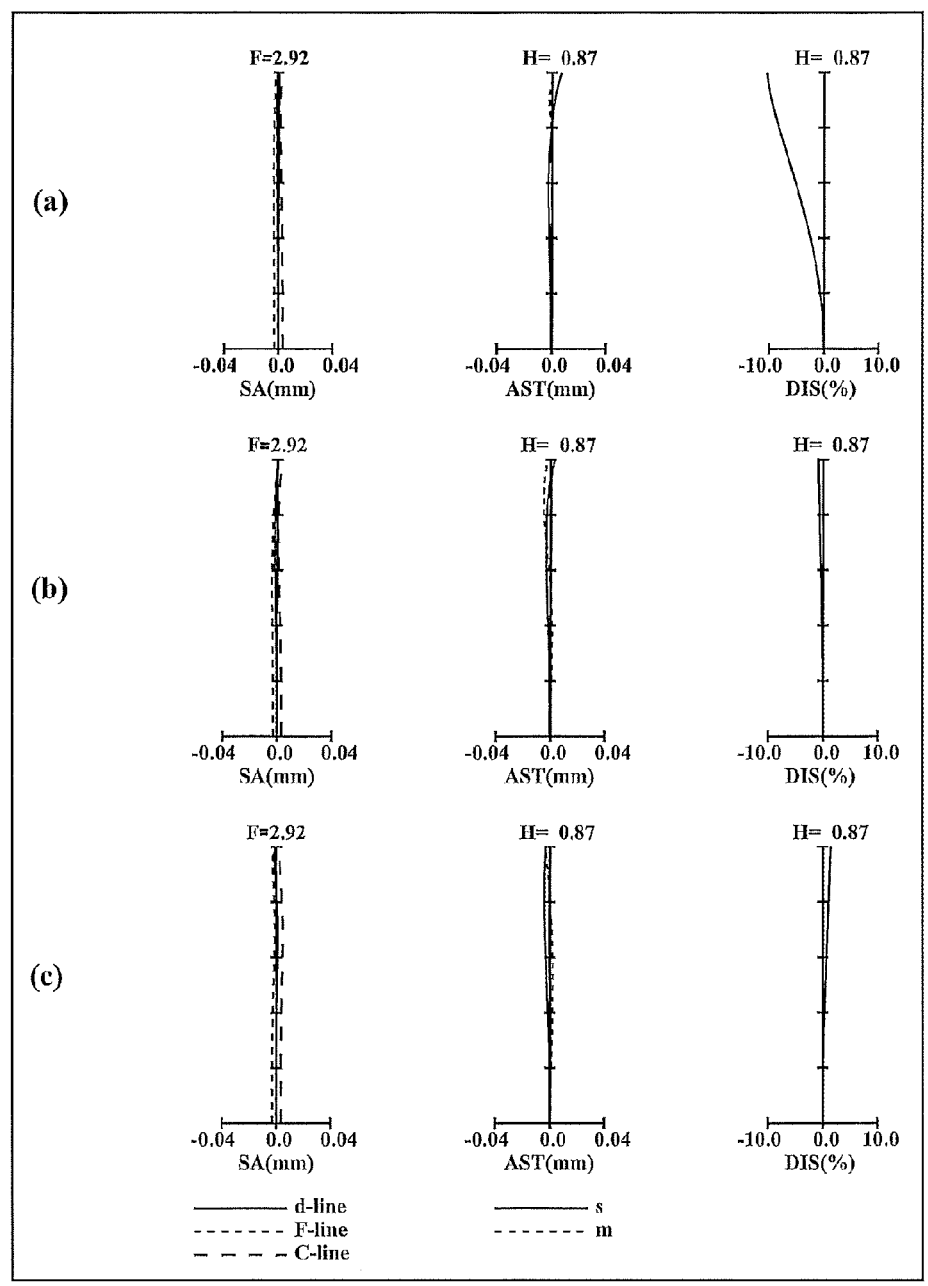
FIG. 14 is a longitudinal aberration diagram of an infinity in-focus condition of the zoom lens system according to Numerical Example 4.
Figure 15:
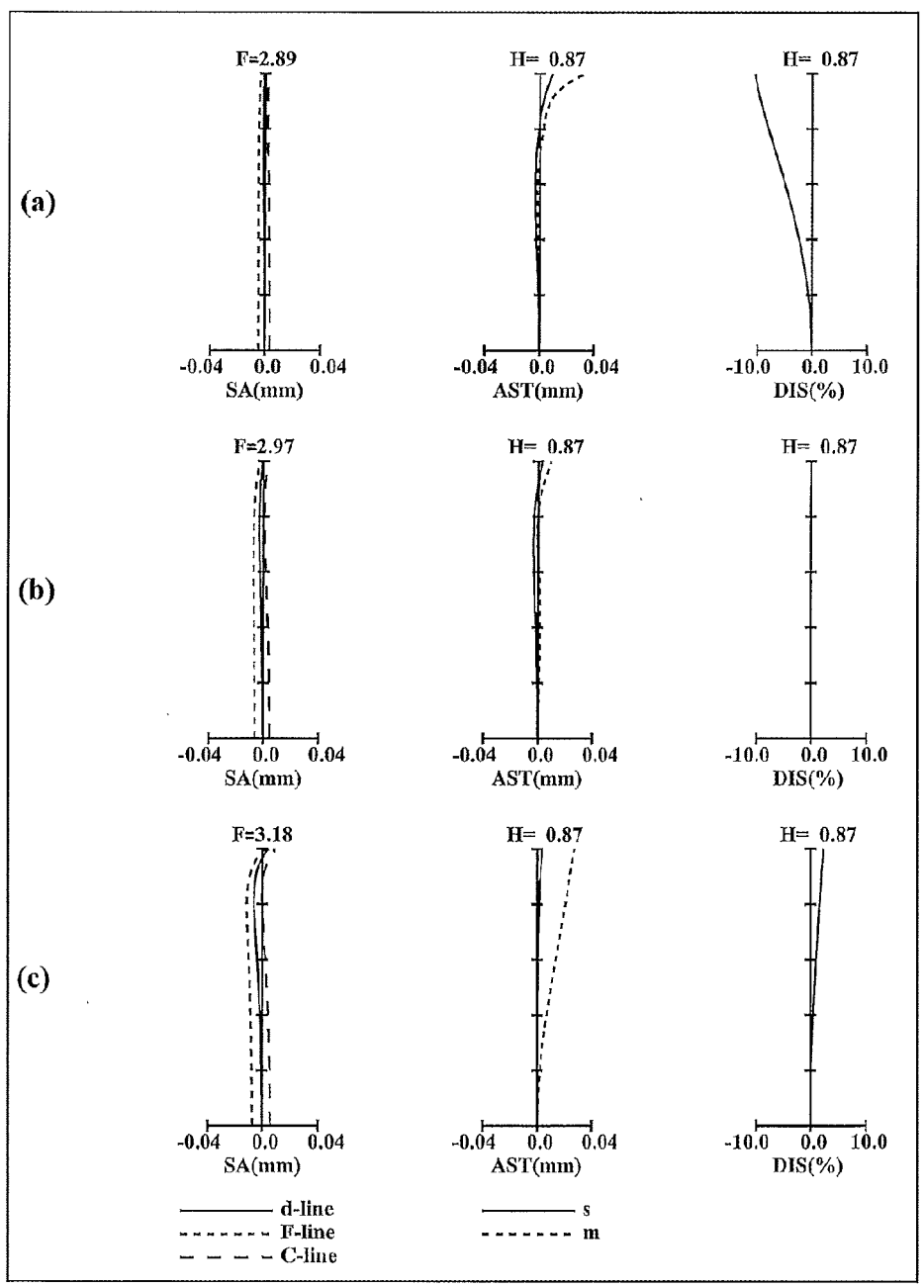
FIG. 15 is a longitudinal aberration diagram of a close-object in-focus condition of the zoom lens system according to Numerical Example 4.
Figure 16:
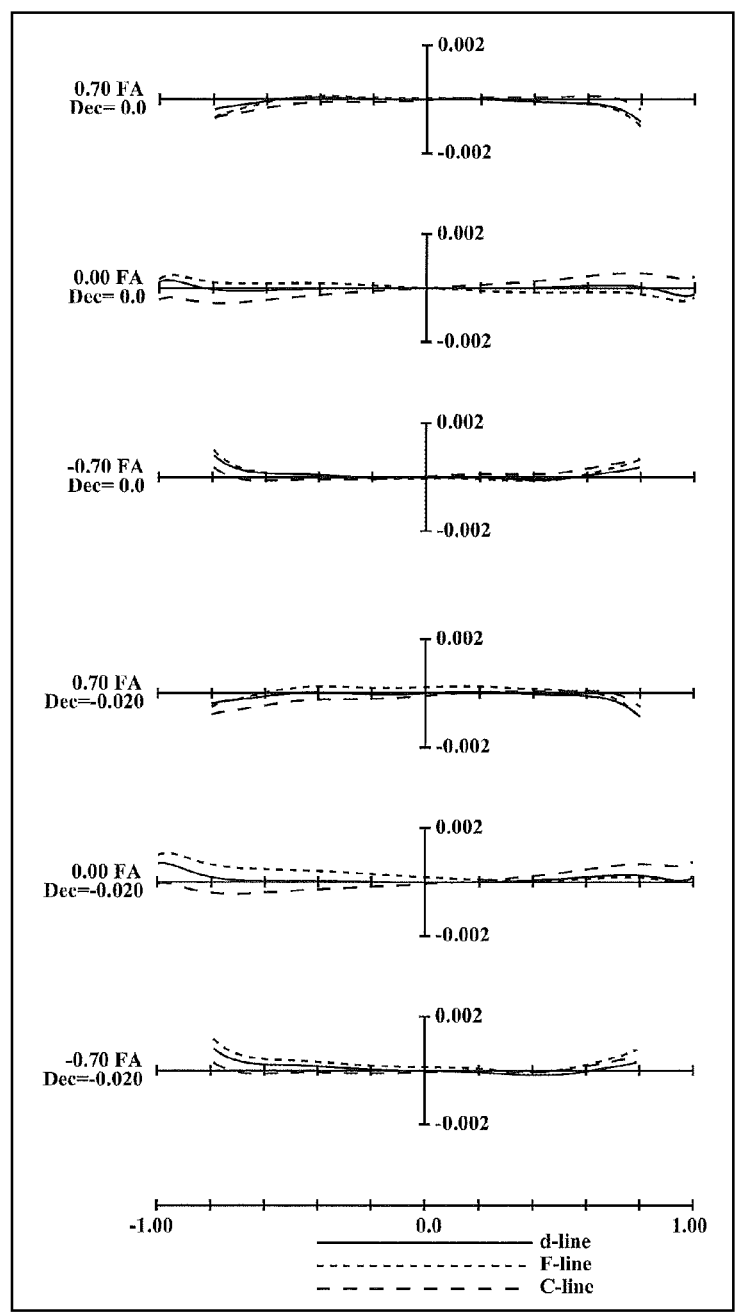
FIG. 16 is a lateral aberration diagram of the zoom lens system according to Numerical Example 4 at a telephoto limit in a basic state where image blur compensation is not performed and in an image blur compensation state.

Further, as shown in FIGS. 1, 5, and 9, an aperture diaphragm A is provided in the fourth lens unit G4, that is, on the object side relative to an eighth lens element L8. Further, as shown in FIG. 13, an aperture diaphragm A is provided in the fourth lens unit G4, that is, on the object side relative to a seventh lens element L7. Further, as shown in FIGS. 17 and 21, the fourth lens unit G4 is composed of only an aperture diaphragm A.

(Embodiment 1)

As shown in FIG. 1, the first lens unit G1, in order from the object side to the image side, comprises: a negative meniscus first lens element L1 with the convex surface facing the object side; a negative meniscus second lens element L2 with the convex surface facing the object side; and a positive meniscus third lens element L3 with the convex surface facing the object side. The second lens element L2 has two aspheric surfaces.

The second lens unit G2, in order from the object side to the image side, comprises: a positive meniscus fourth lens element L4 with the convex surface facing the object side; a negative meniscus fifth lens element L5 with the convex surface facing the object side; and a bi-convex sixth lens element L6. Among these, the fifth lens element L5 and the sixth lens element L6 are cemented with each other.

The third lens unit G3 comprises solely a negative meniscus seventh lens element L7 with the convex surface facing the image side.

The fourth lens unit G4 comprises solely a bi-concave eighth lens element L8. The eighth lens element L8 has an aspheric object side surface. An aperture diaphragm A is provided on the object side relative to the eighth lens element L8.

The fifth lens unit G5, in order from the object side to the image side, comprises: a negative meniscus ninth lens element L9 with the convex surface facing the object side; a bi-convex tenth lens element L10; and a positive meniscus eleventh lens element L11 with the convex surface facing the object side. Among these, the ninth lens element L9 and the tenth lens element L10 are cemented with each other. The eleventh lens element L11 has an aspheric object side surface.

The sixth lens unit G6 comprises solely a bi-concave twelfth lens element L12. The twelfth lens element L12 has two aspheric surfaces.

The seventh lens unit G7 comprises solely a positive meniscus thirteenth lens element L13 with the convex surface facing the object side.

In the zoom lens system according to Embodiment 1, the eighth lens element L8 constituting the fourth lens unit G4 corresponds to an image blur compensating lens unit that moves in a direction perpendicular to the optical axis in order to optically compensate image blur, which is described later.

In the zoom lens system according to Embodiment 1, in zooming from a wide-angle limit to a telephoto limit at the time of image taking, the first lens unit G1 moves with locus of a slight convex to the image side, and the second lens unit G2, the third lens unit G3, the fourth lens unit G4, the fifth lens unit G5, the sixth lens unit G6, and the seventh lens unit G7 monotonically move to the object side. That is, in zooming, the respective lens units individually move along the optical axis such that the interval between the first lens unit G1 and the second lens unit G2 and the interval between the fourth lens unit G4 and the fifth lens unit G5 decrease, the interval between the second lens unit G2 and the third lens unit G3 and the interval between the sixth lens unit G6 and the seventh lens unit G7 increase, and the interval between the third lens unit G3 and the fourth lens unit G4 and the interval between the fifth lens unit G5 and the sixth lens unit G6 vary In the zoom lens system according to Embodiment 1, in focusing from an infinity in-focus condition to a close-object in-focus condition, the third lens unit G3 serving as a focusing lens unit moves to the object side along the optical axis in any zooming condition, and the sixth lens unit G6 serving as another focusing lens unit moves to the image side along the optical axis in any zooming condition. The third lens unit G3 corresponds to a second focusing lens unit described later, and the sixth lens unit G6 corresponds to a first focusing lens unit described later.

(Embodiment 2)

As shown in FIG. 5, the first lens unit G1, in order from the object side to the image side, comprises: a negative meniscus first lens element L1 with the convex surface facing the object side; a bi-concave second lens element L2; and a positive meniscus third lens element L3 with the convex surface facing the object side. The second lens element L2 has two aspheric surfaces.

The second lens unit G2, in order from the object side to the image side, comprises: a bi-convex fourth lens element L4; a negative meniscus fifth lens element L5 with the convex surface facing the object side; and a bi-convex sixth lens element L6. Among these, the fifth lens element L5 and the sixth lens element L6 are cemented with each other.

The third lens unit G3 comprises solely a bi-concave seventh lens element L7.

The fourth lens unit G4 comprises solely a bi-concave eighth lens element L8. The eighth lens element L8 has an aspheric object side surface. An aperture diaphragm A is provided on the object side relative to the eighth lens element L8.

The fifth lens unit G5, in order from the object side to the image side, comprises: a negative meniscus ninth lens element L9 with the convex surface facing the object side; a bi-convex tenth lens element L10; and a positive meniscus eleventh lens element L11 with the convex surface facing the object side. Among these, the ninth lens element L9 and the tenth lens element L10 are cemented with each other. The eleventh lens element L11 has an aspheric object side surface.

The sixth lens unit G6 comprises solely a bi-concave twelfth lens element L12. The twelfth lens element L12 has two aspheric surfaces.

The seventh lens unit G7 comprises solely a bi-convex thirteenth lens element L13.

In the zoom lens system according to Embodiment 2, the eighth lens element L8 constituting the fourth lens unit G4 corresponds to an image blur compensating lens unit that moves in a direction perpendicular to the optical axis in order to optically compensate image blur, which is described later.

In the zoom lens system according to Embodiment 2, in zooming from a wide-angle limit to a telephoto limit at the time of image taking, the first lens unit G1 moves with locus of a slight convex to the image side, and the second lens unit G2, the third lens unit G3, the fourth lens unit G4, the fifth lens unit G5, the sixth lens unit G6, and the seventh lens unit G7 monotonically move to the object side. That is, in zooming, the respective lens units individually move along the optical axis such that the interval between the first lens unit G1 and the second lens unit G2 and the interval between the fourth lens unit G4 and the fifth lens unit G5 decrease, the interval between the second lens unit G2 and the third lens unit G3 and the interval between the sixth lens unit G6 and the seventh lens unit G7 increase, and the interval between the third lens unit G3 and the fourth lens unit G4 and the interval between the fifth lens unit G5 and the sixth lens unit G6 vary.

In the zoom lens system according to Embodiment 2, in focusing from an infinity in-focus condition to a close-object in-focus condition, the third lens unit G3 serving as a focusing lens unit moves to the object side along the optical axis in any zooming condition, and the sixth lens unit G6 serving as another focusing lens unit moves to the image side along the optical axis in any zooming condition. The third lens unit G3 corresponds to a second focusing lens unit described later, and the sixth lens unit G6 corresponds to a first focusing lens unit described later.

(Embodiment 3)

As shown in FIG. 9, the first lens unit G1, in order from the object side to the image side, comprises: a negative meniscus first lens element L1 with the convex surface facing the object side; a negative meniscus second lens element L2 with the convex surface facing the object side; and a positive meniscus third lens element L3 with the convex surface facing the object side. The second lens element L2 has two aspheric surfaces.

The second lens unit G2, in order from the object side to the image side, comprises: a positive meniscus fourth lens element L4 with the convex surface facing the object side; a negative meniscus fifth lens element L5 with the convex surface facing the object side; and a bi-convex sixth lens element L6. Among these, the fifth lens element L5 and the sixth lens element L6 are cemented with each other.

The third lens unit G3 comprises solely a bi-concave seventh lens element L7.

The fourth lens unit G4 comprises solely a bi-concave eighth lens element L8. The eighth lens element L8 has an aspheric object side surface. An aperture diaphragm A is provided on the object side relative to the eighth lens element L8.

The fifth lens unit G5, in order from the object side to the image side, comprises: a negative meniscus ninth lens element L9 with the convex surface facing the object side; a bi-convex tenth lens element L10; and a positive meniscus eleventh lens element L11 with the convex surface facing the object side. Among these, the ninth lens element L9 and the tenth lens element L10 are cemented with each other. The eleventh lens element L11 has an aspheric object side surface.

The sixth lens unit G6 comprises solely a bi-concave twelfth lens element L12. The twelfth lens element L12 has two aspheric surfaces.

The seventh lens unit G7 comprises solely a positive meniscus thirteenth lens element L13 with the convex surface facing the object side.

In the zoom lens system according to Embodiment 3, the eighth lens element L8 constituting the fourth lens unit G4 corresponds to an image blur compensating lens unit that moves in a direction perpendicular to the optical axis in order to optically compensate image blur, which is described later.

In the zoom lens system according to Embodiment 3, in zooming from a wide-angle limit to a telephoto limit at the time of image taking, the first lens unit G1 moves with locus of a slight convex to the image side, and the second lens unit G2, the third lens unit G3, the fourth lens unit G4, the fifth lens unit G5, the sixth lens unit G6, and the seventh lens unit G7 monotonically move to the object side. That is, in zooming, the respective lens units individually move along the optical axis such that the interval between the first lens unit G1 and the second lens unit G2 and the interval between the fourth lens unit G4 and the fifth lens unit G5 decrease, the interval between the second lens unit G2 and the third lens unit G3 and the interval between the sixth lens unit G6 and the seventh lens unit G7 increase, and the interval between the third lens unit G3 and the fourth lens unit G4 and the interval between the fifth lens unit G5 and the sixth lens unit G6 vary In the zoom lens system according to Embodiment 3, in focusing from an infinity in-focus condition to a close-object in-focus condition, the third lens unit G3 serving as a focusing lens unit moves to the object side along the optical axis in any zooming condition, and the sixth lens unit G6 serving as another focusing lens unit moves to the image side along the optical axis in any zooming condition. The third lens unit G3 corresponds to a second focusing lens unit described later, and the sixth lens unit G6 corresponds to a first focusing lens unit described later.

(Embodiment 4)

As shown in FIG. 13, the first lens unit G1, in order from the object side to the image side, comprises: a negative meniscus first lens element L1 with the convex surface facing the object side; a negative meniscus second lens element L2 with the convex surface facing the object side; and a positive meniscus third lens element L3 with the convex surface facing the object side. The second lens element L2 has two aspheric surfaces.

The second lens unit G2, in order from the object side to the image side, comprises: a negative meniscus fourth lens element L4 with the convex surface facing the object side; and a bi-convex fifth lens element L5. The fourth lens element L4 and the fifth lens element L5 are cemented with each other. The fifth lens element L5 has an aspheric image side surface.

The third lens unit G3 comprises solely a positive meniscus sixth lens element L6 with the convex surface facing the object side. The sixth lens element L6 has an aspheric object side surface.

The fourth lens unit G4, in order from the object side to the image side, comprises: a bi-concave seventh lens element L7; and a bi-concave eighth lens element L8. An aperture diaphragm A is provided on the object side relative to the seventh lens element L7.

The fifth lens unit G5, in order from the object side to the image side, comprises: a negative meniscus ninth lens element L9 with the convex surface facing the object side; and a bi-convex tenth lens element L10. The ninth lens element L9 and the tenth lens element L10 are cemented with each other. The tenth lens element L10 has an aspheric image side surface.

The sixth lens unit G6 comprises solely a bi-concave eleventh lens element L11.

The seventh lens unit G7, in order from the object side to the image side, comprises: a bi-convex twelfth lens element L12, and a bi-concave thirteenth lens element L13. The twelfth lens element L12 and the thirteenth lens element L13 are cemented with each other.

In the zoom lens system according to Embodiment 4, the seventh lens element L7 constituting the fourth lens unit G4 corresponds to an image blur compensating lens unit that moves in a direction perpendicular to the optical axis in order to optically compensate image blur, which is described later.

In the zoom lens system according to Embodiment 4, in zooming from a wide-angle limit to a telephoto limit at the time of image taking, the first lens unit G1 monotonically moves to the image side, and the second lens unit G2, the third lens unit G3, the fourth lens unit G4, the fifth lens unit G5, the sixth lens unit G6, and the seventh lens unit G7 monotonically move to the object side. That is, in zooming, the respective lens units individually move along the optical axis such that the interval between the first lens unit G1 and the second lens unit G2, the interval between the fourth lens unit G4 and the fifth lens unit G5, and the interval between the fifth lens unit G5 and the sixth lens unit G6 decrease, the interval between the third lens unit G3 and the fourth lens unit G4 and the interval between the sixth lens unit G6 and the seventh lens unit G7 increase, and the interval between the second lens unit G2 and the third lens unit G3 varies.

In the zoom lens system according to Embodiment 4, in focusing from an infinity in-focus condition to a close-object in-focus condition, the third lens unit G3 serving as a focusing lens unit moves to the object side along the optical axis in any zooming condition, and the sixth lens unit G6 serving as another focusing lens unit moves to the image side along the optical axis in any zooming condition. The third lens unit G3 corresponds to a second focusing lens unit described later, and the sixth lens unit G6 corresponds to a first focusing lens unit described later.

(Embodiment 5)

As shown in FIG. 17, the first lens unit G1, in order from the object side to the image side, comprises: a negative meniscus first lens element L1 with the convex surface facing the object side; a negative meniscus second lens element L2 with the convex surface facing the object side; and a positive meniscus third lens element L3 with the convex surface facing the object side. The second lens element L2 has two aspheric surfaces.

The second lens unit G2, in order from the object side to the image side, comprises: a negative meniscus fourth lens element L4 with the convex surface facing the object side; and a bi-convex fifth lens element L5. The fourth lens element L4 and the fifth lens element L5 are cemented with each other. The fifth lens element L5 has an aspheric image side surface.

The third lens unit G3 comprises solely a positive meniscus sixth lens element L6 with the convex surface facing the object side. The sixth lens element L6 has an aspheric object side surface.

The fourth lens unit G4 comprises solely an aperture diaphragm A.

The fifth lens unit G5, in order from the object side to the image side, comprises: a bi-concave seventh lens element L7, and a bi-concave eighth lens element L8.

The sixth lens unit G6, in order from the object side to the image side, comprises: a negative meniscus ninth lens element L9 with the convex surface facing the object side; and a bi-convex tenth lens element L10. The ninth lens element L9 and the tenth lens element L10 are cemented with each other. The tenth lens element L10 has an aspheric image side surface.

The seventh lens unit G7 comprises solely a bi-concave eleventh lens element L11.

The eighth lens unit G8, in order from the object side to the image side, comprises: a bi-convex twelfth lens element L12, and a bi-concave thirteenth lens element L13. The twelfth lens element L12 and the thirteenth lens element L13 are cemented with each other.

In the zoom lens system according to Embodiment 5, the seventh lens element L7 constituting the fifth lens unit G5 corresponds to an image blur compensating lens unit that moves in a direction perpendicular to the optical axis in order to optically compensate image blur, which is described later.

In the zoom lens system according to Embodiment 5, in zooming from a wide-angle limit to a telephoto limit at the time of image taking, the first lens unit G1 monotonically moves to the image side, and the second lens unit G2, the third lens unit G3, the fourth lens unit G4, the fifth lens unit G5, the sixth lens unit G6, the seventh lens unit G7, and the eighth lens unit G8 monotonically move to the object side. That is, in zooming, the respective lens units individually move along the optical axis such that the interval between the first lens unit G1 and the second lens unit G2, the interval between the fifth lens unit G5 and the sixth lens unit G6, and the interval between the sixth lens unit G6 and the seventh lens unit G7 decrease, the interval between the third lens unit G3 and the fourth lens unit G4, the interval between the fourth lens unit G4 and the fifth lens unit G5, and the interval between the seventh lens unit G7 and the eighth lens unit G8 increase, and the interval between the second lens unit G2 and the third lens unit G3 does not vary in an infinity in-focus condition.

In the zoom lens system according to Embodiment 5, in focusing from an infinity in-focus condition to a close-object in-focus condition, the third lens unit G3 serving as a focusing lens unit moves to the object side along the optical axis in any zooming condition, and the seventh lens unit G7 serving as another focusing lens unit moves to the image side along the optical axis in any zooming condition. The third lens unit G3 corresponds to a second focusing lens unit described later, and the seventh lens unit G7 corresponds to a first focusing lens unit described later.

(Embodiment 6)

As shown in FIG. 21, the first lens unit G1, in order from the object side to the image side, comprises: a negative meniscus first lens element L1 with the convex surface facing the object side; a bi-concave second lens element L2; and a bi-convex third lens element L3. The first lens element L1 has an aspheric image side surface, and the second lens element L2 has two aspheric surfaces.

The second lens unit G2, in order from the object side to the image side, comprises: a negative meniscus fourth lens element L4 with the convex surface facing the object side; and a bi-convex fifth lens element L5. The fourth lens element L4 and the fifth lens element L5 are cemented with each other.

The third lens unit G3 comprises solely a bi-convex sixth lens element L6.

The fourth lens unit G4 comprises solely an aperture diaphragm A.

The fifth lens unit G5, in order from the object side to the image side, comprises: a bi-concave seventh lens element L7; a negative meniscus eighth lens element L8 with the convex surface facing the object side; a positive meniscus ninth lens element L9 with the convex surface facing the object side; and a bi-convex tenth lens element L10. Among these, the eighth lens element L8 and the ninth lens element L9 are cemented with each other. The seventh lens element L7 has an aspheric object side surface.

The sixth lens unit G6 comprises solely a negative meniscus eleventh lens element L11 with the convex surface facing the object side.

The seventh lens unit G7 comprises solely a positive meniscus twelfth lens element L12 with the convex surface facing the image side. The twelfth lens element L12 has an aspheric image side surface.

In the zoom lens system according to Embodiment 6, in zooming from a wide-angle limit to a telephoto limit at the time of image taking, the first lens unit G1 and the second lens unit G2 each move with locus of a slight convex to the image side, the third lens unit G3, the fourth lens unit G4, the fifth lens unit G5, and the sixth lens unit G6 move to the object side, and the seventh lens unit G7 moves with locus of a slight convex to the object side. That is, in zooming, the respective lens units individually move along the optical axis such that the interval between the first lens unit G1 and the second lens unit G2, the interval between the second lens unit G2 and the third lens unit G3, and the interval between the fourth lens unit G4 and the fifth lens unit G5 decrease, the interval between the third lens unit G3 and the fourth lens unit G4 and the interval between the sixth lens unit G6 and the seventh lens unit G7 increase, and the interval between the fifth lens unit G5 and the sixth lens unit G6 does not substantially vary in an infinity in-focus condition. The third lens unit G3 and the fifth lens unit G5 move with the same locus.

In the zoom lens system according to Embodiment 6, in focusing from an infinity in-focus condition to a close-object in-focus condition, the sixth lens unit G6 serving as a focusing lens unit moves to the image side along the optical axis in any zooming condition. The sixth lens unit G6 corresponds to a first focusing lens unit described later.

The zoom lens systems according to Embodiments 1 to 6 each have a plurality of lens units each comprising at least one lens element, and comprise, in order from the object side to the image side, the first lens unit G1 having negative optical power and including at least one lens element having positive optical power, and the second lens unit G2 having positive optical power and including at least one lens element having negative optical power. Therefore, chromatic aberration can be successfully compensated in each zooming area.

In the zoom lens systems according to Embodiments 1 to 6, subsequent lens units including the aperture diaphragm A are provided on the image side relative to the second lens unit G2. Therefore, the diameter of the aperture diaphragm A can be reduced, and thereby the entirety of a lens barrel can be reduced.

In the zoom lens systems according to Embodiments 1 to 6, a most image side lens unit that is fixed with respect to the image surface S in focusing from an infinity in-focus condition to a close-object in-focus condition is provided closest to the image side, and the first focusing lens unit that moves along the optical axis in the focusing is provided between the aperture diaphragm A and the most image side lens unit. Therefore, reduction in weight of the first focusing lens unit is achieved, and thereby reduction in size of an actuator is achieved. Thus, the entirety of the lens barrel can be reduced.

In the zoom lens systems according to Embodiments 1 to 6, the first lens unit G1, in order from the object side to the image side, comprises the first lens element L1 having negative optical power, the second lens element L2 having negative optical power, and the third lens element L3 having positive optical power, and the second lens element L2 has two aspheric surfaces. Therefore, curvature of field and distortion particularly at a wide-angle limit can be successfully compensated. Further, the second lens element L2 has a small diameter, and therefore, can be formed as an aspheric lens inexpensively.

In the zoom lens systems according to Embodiments 1 to 5, a part or an entirety of a lens unit provided adjacent to the object side of the aperture diaphragm A is the second focusing lens unit that moves along the optical axis in the focusing. Therefore, aberration fluctuation from an infinity in-focus condition to a close-point in-focus condition can be suppressed. Further, reduction in weight of the second focusing lens unit is achieved, and thereby reduction in size of an actuator is achieved. Thus, the entirety of the lens barrel can be reduced.

In the zoom lens systems according to Embodiments 1 to 5, the image blur compensating lens unit that moves in a direction perpendicular to the optical axis is provided in order to move the position of the image in the direction perpendicular to the optical axis. The image blur compensating lens unit can optically compensate image point movement caused by vibration of the entire system; that is, image blur caused by hand blurring, vibration and the like.

When compensating image point movement caused by vibration of the entire system, the image blur compensating lens unit moves in the direction perpendicular to the optical axis. Therefore, image blur compensation can be performed in a state that size increase in the entire zoom lens system is suppressed to realize a compact construction, and that excellent imaging characteristics such as small decentering coma aberration and small decentering astigmatism are satisfied.

The image blur compensating lens unit may be a single lens unit. In case a single lens unit is composed of a plurality of lens elements, the image blur compensating lens unit may be any one lens element or a plurality of adjacent lens elements among the plurality of lens elements.

As described above, Embodiments 1 to 6 have been described as examples of art disclosed in the present application. However, the art in the present disclosure is not limited to these embodiments. It is understood that various modifications, replacements, additions, omissions, and the like have been performed in these embodiments to give optional embodiments, and the art in the present disclosure can be applied to the optional embodiments.

The following description is given for conditions that a zoom lens system like the zoom lens systems according to Embodiments 1 to 6 can satisfy. Here, a plurality of conditions is set forth for the zoom lens system according to each embodiment. A construction that satisfies all the plural conditions is most effective for the zoom lens system. However, when an individual condition is satisfied, a zoom lens system having the corresponding effect is obtained.

For example, in a zoom lens system like the zoom lens systems according to Embodiments 1 to 6, which has a plurality of lens units each comprising at least one lens element, and comprises, in order from the object side to the image side, a first lens unit having negative optical power and including at least one lens element having positive optical power, a second lens unit having positive optical power and including at least one lens element having negative optical power, and subsequent lens units including an aperture diaphragm, wherein the subsequent lens units include a most image side lens unit that is provided closest to the image side and is fixed with respect to the image surface in focusing from an infinity in-focus condition to a close-object in-focus condition, and a first focusing lens unit that moves along the optical axis in the focusing is provided between the aperture diaphragm and the most image side lens unit (this lens configuration is referred to as a basic configuration of the embodiment, hereinafter), the following conditions (1) and (2) are satisfied:

$$1.0 < L_{SW}/\{f_T \times \tan(\omega_T)\} < 2.6 \tag{1}$$

$$0.8 < L_{G1G2}/f_W < 2.8 \tag{2}$$

where $L_{SW}$ is an axial distance from the aperture diaphragm to the image surface at a wide-angle limit in an infinity in-focus condition, $f_T$ is a focal length of the zoom lens system at a telephoto limit in the infinity in-focus condition, $\omega_T$ is a half view angle at the telephoto limit in the infinity in-focus condition, $L_{G1G2}$ is an axial distance between a most image side lens element in the first lens unit and a most object side lens element in the second lens unit at the wide-angle limit in the infinity in-focus condition, and $f_W$ is a focal length of the zoom lens system at the wide-angle limit in the infinity in-focus condition.

The condition (1) sets forth the position of the aperture diaphragm at the wide-angle limit. When the value goes below the lower limit of the condition (1), the angle of light beam incident on the image surface in the peripheral part becomes excessively large, which causes shading. When the value exceeds the upper limit of the condition (1), the overall length of lens system is increased.

When at least one of the following conditions (1)' and (1)" is further satisfied, the above-mentioned effect is achieved more successfully.

$$1.7 < L_{SW}/\{f_T \times \tan(\omega_T)\} \tag{1}'$$

$$L_{SW}/\{f_T \times \tan(\omega_T)\} < 2.5 \tag{1}''$$

The condition (2) sets forth the interval between the first lens unit and the second lens unit at the wide-angle limit. When the value goes below the lower limit of the condition (2), aberration at the wide-angle limit cannot be sufficiently suppressed. When the value exceeds the upper limit of the condition (2), the overall length of lens system is increased.

When at least one of the following conditions (2)' and (2)" is further satisfied, the above-mentioned effect is achieved more successfully.

$$1.1 < L_{G1G2}/f_W \tag{2}'$$

$$L_{G1G2}/f_W < 2.4 \tag{2}''$$

It is beneficial that a zoom lens system having the basic configuration like the zoom lens systems according to Embodiments 1 to 6 satisfies the following condition (3):

$$1.3 < |f_{G1}/f_W| < 2.5 \tag{3}$$

where $f_{G1}$ is a focal length of the first lens unit, and $f_W$ is the focal length of the zoom lens system at the wide-angle limit in the infinity in-focus condition.

The condition (3) sets forth the focal length of the first lens unit. When the value goes below the lower limit of the condition (3), the amount of aberration that occurs when the first lens unit is decentered is increased, which might make it difficult to configure the lens system. When the value exceeds the upper limit of the condition (3), the overall length of lens system might be increased.

When at least one of the following conditions (3)' and (3)" is further satisfied, the above-mentioned effect is achieved more successfully.

$$1.4 < |f_{G1}/f_W| \tag{3}'$$

$$|f_{G1}/f_W| < 2.3 \tag{3}''$$

It is beneficial that a zoom lens system having the basic configuration like the zoom lens systems according to Embodiments 1 to 6 satisfies the following condition (4):

$$1.0 < f_{G2}/f_W < 10.0 \tag{4}$$

where $f_{G2}$ is a focal length of the second lens unit, and $f_W$ is the focal length of the zoom lens system at the wide-angle limit in the infinity in-focus condition.

The condition (4) sets forth the focal length of the second lens unit. When the value goes below the lower limit of the condition (4), the amount of aberration that occurs when the second lens unit is decentered is increased, which might make it difficult to configure the lens system. When the value exceeds the upper limit of the condition (4), the overall length of lens system might be increased.

When at least one of the following conditions (4)' and (4)" is further satisfied, the above-mentioned effect is achieved more successfully.

$$1.1 < f_{G2}/f_W \tag{4}'$$

$$f_{G2}/f_W < 8.0 \tag{4}''$$

It is beneficial that a zoom lens system having the basic configuration like the zoom lens systems according to Embodiments 1 to 6, in which the most image side lens unit has positive optical power, satisfies the following condition (5):

$$2.0 < f_{GMI}/f_W < 12.0 \tag{5}$$

where $f_{GMI}$ is a focal length of the most image side lens unit, and $f_W$ is the focal length of the zoom lens system at the wide-angle limit in the infinity in-focus condition.

The condition (5) sets forth the focal length of the most image side lens unit. When the value goes below the lower limit of the condition (5), curvature of field at the telephoto limit might be increased. When the value exceeds the upper limit of the condition (5), the angle of light beam incident on the image surface in the peripheral part becomes excessively large, which might cause shading.

When at least one of the following conditions (5)' and (5)" is further satisfied, the above-mentioned effect is achieved more successfully.

$$2.5 < f_{GMI}/f_W \tag{5}'$$

$$f_{GMI}/f_W < 10.0 \tag{5}''$$

It is beneficial that a zoom lens system having the basic configuration like the zoom lens systems according to Embodiments 1 to 6, in which the first lens unit, in order from the object side to the image side, comprises a first lens element having negative optical power, a second lens element having negative optical power, and a third lens element having positive optical power, satisfies the following condition (6):

$$-2.5 < (R2_{L1}+R1_{L1})/(R2_{L1}-R1_{L1}) < -0.9 \quad (6)$$

where $R1_{L1}$ is a radius of curvature of an object side surface of the first lens element, and $R2_{L1}$ is a radius of curvature of an image side surface of the first lens element.

The condition (6) sets forth a shape factor of the first lens element. When the value goes below the lower limit of the condition (6), it might become difficult to compensate magnification chromatic aberration at the wide-angle limit. When the value exceeds the upper limit of the condition (6), it might become difficult to compensate curvature of field at the wide-angle limit.

When at least one of the following conditions (6)' and (6)" is further satisfied, the above-mentioned effect is achieved more successfully.

$$-2.0 < (R2_{L1}+R1_{L1})/(R2_{L1}-R1_{L1}) \quad (6)'$$

$$(R2_{L1}+R1_{L1})/(R2_{L1}-R1_{L1}) < -1.0 \quad (6)''$$

It is beneficial that a zoom lens system having the basic configuration like the zoom lens systems according to Embodiments 1 to 6, in which the first focusing lens unit has negative optical power, satisfies the following condition (7):

$$1.0 < |f_{F1}/f_W| < 3.0 \quad (7)$$

where $f_{F1}$ is a focal length of the first focusing lens unit, and $f_W$ is the focal length of the zoom lens system at the wide-angle limit in the infinity in-focus condition.

The condition (7) sets forth the focal length of the first focusing lens unit. When the value goes below the lower limit of the condition (7), the amount of aberration that occurs when the first focusing lens unit is decentered is increased, which might make it difficult to configure the lens system. When the value exceeds the upper limit of the condition (7), the amount of movement of the first focusing lens unit in focusing is increased, which might cause increase in the overall length of lens system.

When at least one of the following conditions (7)' and (7)" is further satisfied, the above-mentioned effect is achieved more successfully.

$$1.2 < |f_{F1}/f_W| \quad (7)'$$

$$|f_{F1}/f_W| < 2.9 \quad (7)''$$

The individual lens units constituting the zoom lens systems according to Embodiments 1 to 6 are each composed exclusively of refractive type lens elements that deflect incident light by refraction (that is, lens elements of a type in which deflection is achieved at the interface between media having different refractive indices). However, the present disclosure is not limited to this construction. For example, the lens units may employ diffractive type lens elements that deflect incident light by diffraction; refractive-diffractive hybrid type lens elements that deflect incident light by a combination of diffraction and refraction; or gradient index type lens elements that deflect incident light by distribution of refractive index in the medium. In particular, in the refractive-diffractive hybrid type lens element, when a diffraction structure is formed in the interface between media having different refractive indices, wavelength dependence of the diffraction efficiency is improved. Thus, such a configuration is beneficial.

(Embodiment 7)

Figure 24:
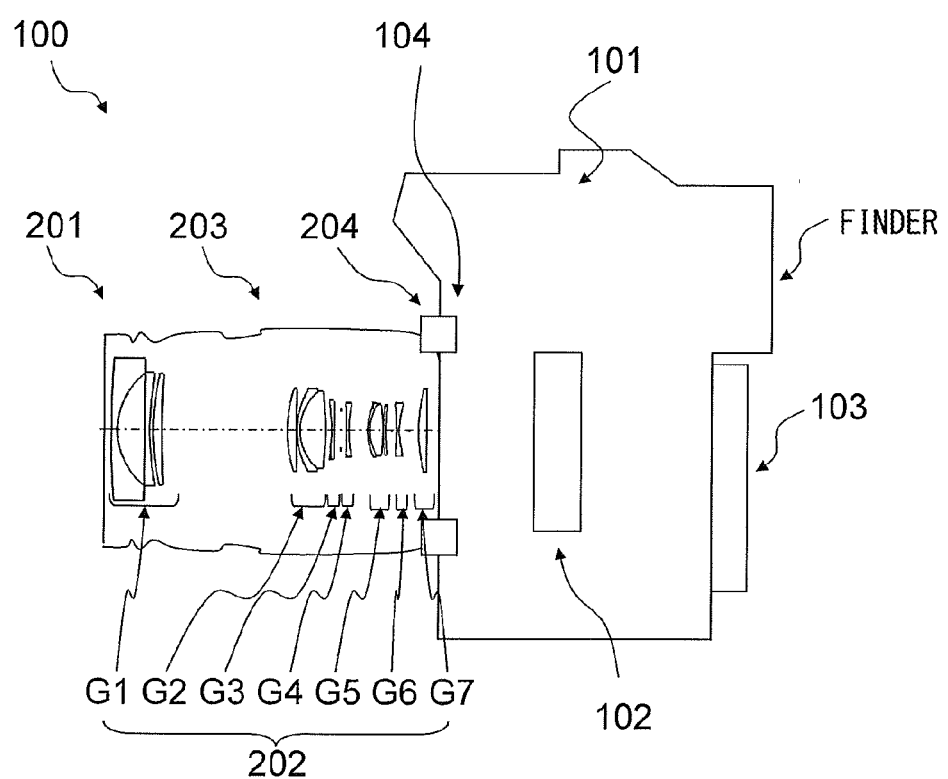
FIG. 24 is a schematic construction diagram of an interchangeable-lens type digital camera system according to Embodiment 7.

FIG. 24 is a schematic construction diagram of an interchangeable-lens type digital camera system according to Embodiment 7.

The interchangeable-lens type digital camera system 100 according to Embodiment 7 includes a camera body 101, and an interchangeable lens apparatus 201 which is detachably connected to the camera body 101.

The camera body 101 includes: an image sensor 102 which receives an optical image formed by a zoom lens system 202 of the interchangeable lens apparatus 201, and converts the optical image into an electric image signal; a liquid crystal monitor 103 which displays the image signal obtained by the image sensor 102; and a camera mount section 104. On the other hand, the interchangeable lens apparatus 201 includes: a zoom lens system 202 according to any of Embodiments 1 to 6; a lens barrel 203 which holds the zoom lens system 202: and a lens mount section 204 connected to the camera mount section 104 of the camera body 101. The camera mount section 104 and the lens mount section 204 are physically connected to each other. Moreover, the camera mount section 104 and the lens mount section 204 function as interfaces which allow the camera body 101 and the interchangeable lens apparatus 201 to exchange signals, by electrically connecting a controller (not shown) in the camera body 101 and a controller (not shown) in the interchangeable lens apparatus 201. In FIG. 24, the zoom lens system according to Embodiment 1 is employed as the zoom lens system 202.

In Embodiment 7, since the zoom lens system 202 according to any of Embodiments 1 to 6 is employed, a compact interchangeable lens apparatus having excellent imaging performance can be realized at low cost. Moreover, size reduction and cost reduction of the entire camera system 100 according to Embodiment 7 can be achieved. In the zoom lens systems according to Embodiments 1 to 6, the entire zooming range need not be used. That is, in accordance with a desired zooming range, a range where satisfactory optical performance is obtained may exclusively be used. Then, the zoom lens system may be used as one having a lower magnification than the zoom lens systems described in Embodiments 1 to 6.

As described above, Embodiment 7 has been described as an example of art disclosed in the present application. However, the art in the present disclosure is not limited to this embodiment. It is understood that various modifications, replacements, additions, omissions, and the like have been performed in this embodiment to give optional embodiments, and the art in the present disclosure can be applied to the optional embodiments.

Numerical examples are described below in which the zoom lens systems according to Embodiments 1 to 6 are implemented. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line. In the numerical examples, the surfaces marked with * are aspherical surfaces, and the aspherical surface configuration is defined by the following expression.

$$Z = \frac{h^2/r}{1+\sqrt{1-(1+\kappa)(h/r)^2}} + \sum A_n h^n$$

Here, the symbols in the formula indicate the following quantities.

Z is a distance from a point on an aspherical surface at a height h relative to the optical axis to a tangential plane at the vertex of the aspherical surface, h is a height relative to the optical axis, r is a radius of curvature at the top, κ is a conic constant, and $A_n$ is a n-th order aspherical coefficient.

FIGS. 2, 6, 10, 14, 18, and 22 are longitudinal aberration diagrams of an infinity in-focus condition of the zoom lens systems according to Numerical Examples 1 to 6, respectively FIGS. 3, 7, 11, 15, 19, and 23 are longitudinal aberration diagrams of a close-object in-focus condition of the zoom lens systems according to Numerical Examples 1 to 6, respectively. The object distance in each of Numerical Examples 1 to 6 is 12.0192 mm.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

FIGS. 4, 8, 12, 16, and 20 are lateral aberration diagrams of the zoom lens systems at a telephoto limit according to Numerical Examples 1 to 5, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the image blur compensating lens unit (Numerical Examples 1 to 3: the eighth lens element L8 in the fourth lens unit G4, Numerical Example 4: the seventh lens element L7 in the fourth lens unit G4, Numerical Example 5: the seventh lens element L7 in the fifth lens unit G5) is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1 and the optical axis of a lens unit having the image blur compensating lens unit.

In the zoom lens system according to each Numerical Example, the amount of movement of the image blur compensating lens unit in a direction perpendicular to the optical axis in an image blur compensation state at a telephoto limit is as follows.

| Numerical Example | Amount of movement (mm) |
|---|---|
| 1 | −0.0186 |
| 2 | −0.0143 |
| 3 | −0.0148 |
| 4 | −0.0200 |
| 5 | −0.0200 |

When the shooting distance is infinity, at a telephoto limit, the amount of image decentering in a case that the zoom lens system inclines by a predetermined angle is equal to the amount of image decentering in a case that the image blur compensating lens unit displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to a predetermined angle without degrading the imaging characteristics.

NUMERICAL EXAMPLE 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows various data in an infinity in-focus condition. Table 4 shows various data in a close-object in-focus condition.

TABLE 1

| (Surface data) | | | | |
|---|---|---|---|---|
| Surface number | r | d | nd | vd |
| Object surface | ∞ | | | |
| 1 | 16.33230 | 0.10020 | 1.71300 | 53.9 |
| 2 | 1.18220 | 0.45210 | | |
| 3* | 13.95860 | 0.08010 | 1.51760 | 63.5 |
| 4* | 3.36130 | 0.05820 | | |
| 5 | 3.94480 | 0.14820 | 1.84666 | 23.8 |

TABLE 1-continued (Surface data)

| Surface number | r | d | nd | vd |
|---|---|---|---|---|
| 6 | 15.92510 | Variable | | |
| 7 | 2.23610 | 0.15020 | 1.80420 | 46.5 |
| 8 | 46.63240 | 0.00800 | | |
| 9 | 1.35710 | 0.04810 | 1.68893 | 31.2 |
| 10 | 0.84540 | 0.41490 | 1.59282 | 68.6 |
| 11 | −5.61780 | Variable | | |
| 12 | −3.21660 | 0.04010 | 1.71736 | 29.5 |
| 13 | −141.50390 | Variable | | |
| 14(Diaphragm) | ∞ | 0.08010 | | |
| 15* | −7.41490 | 0.04010 | 1.51760 | 63.5 |
| 16 | 2.03170 | Variable | | |
| 17 | 1.12690 | 0.03210 | 1.80518 | 25.5 |
| 18 | 0.81680 | 0.21670 | 1.59282 | 68.6 |
| 19 | −3.24970 | 0.00800 | | |
| 20* | 2.44040 | 0.04010 | 1.51760 | 63.5 |
| 21 | 2.96720 | Variable | | |
| 22* | −8.96030 | 0.04010 | 1.80998 | 40.9 |
| 23* | 1.22810 | Variable | | |
| 24 | 2.68390 | 0.13640 | 1.84666 | 23.8 |
| 25 | 232.10240 | Variable | | |
| 26 | ∞ | (BF) | | |
| Image surface | ∞ | | | |

TABLE 2

(Aspherical data)

Surface No. 3

K = 0.00000E+00, A4 = −1.60561E−01, A6 = 2.87001E−01,
A8 = −1.77633E−01 A10 = 1.96458E−02
Surface No. 4

K = 0.00000E+00, A4 = −1.81024E−01, A6 = 2.84476E−01,
A8 = −1.95221E−01 A10 = 1.22455E−02
Surface No. 15

K = 0.00000E+00, A4 = 4.46272E−02, A6 = −5.19709E−02,
A8 = 0.00000E+00 A10 = 0.00000E+00
Surface No. 20

K = 0.00000E+00, A4 = −4.45688E−01, A6 = 5.33100E−01,
A8 = −3.87056E+00 A10 = 8.72362E+00
Surface No. 22

K = 0.00000E+00, A4 = −3.72704E−01, A6 = 6.74732E−02,
A8 = 0.00000E+00 A10 = 0.00000E+00
Surface No. 23

K = 0.00000E+00, A4 = −4.00437E−01, A6 = 2.49915E−01,
A8 = 2.89334E−01 A10 = −7.26838E−01

TABLE 3

(Various data in an infinity in-focus condition)

Zooming ratio 2.63642

| | Wide-angle limit | Middle position | Telephoto limit |
|---|---|---|---|
| Focal length | 1.0001 | 1.6243 | 2.6368 |
| F-number | 2.91284 | 2.91950 | 2.91362 |
| Half view angle | 43.9473 | 28.0651 | 17.7759 |
| Image height | 0.8670 | 0.8670 | 0.8670 |
| Overall length of lens system | 5.7120 | 4.8688 | 4.6973 |
| BF | 0.00049 | 0.00040 | 0.00066 |
| d6 | 2.0578 | 0.8132 | 0.0400 |
| d11 | 0.1054 | 0.1931 | 0.3855 |
| d13 | 0.1197 | 0.1595 | 0.1194 |

TABLE 3-continued (Various data in an infinity in-focus condition)

| d16 | 0.3198 | 0.1924 | 0.0400 |
|---|---|---|---|
| d21 | 0.1818 | 0.1143 | 0.1317 |
| d23 | 0.3196 | 0.3602 | 0.7978 |
| d25 | 0.5137 | 0.9420 | 1.0885 |

Zoom lens unit data

| Lens unit | Initial surface No. | Focal length |
|---|---|---|
| 1 | 1 | −2.01129 |
| 2 | 7 | 1.24023 |
| 3 | 12 | −4.58879 |
| 4 | 14 | −3.07658 |
| 5 | 17 | 1.50376 |
| 6 | 22 | −1.33110 |
| 7 | 24 | 3.20618 |

TABLE 4

(Various data in a close-object in-focus condition)

| | Wide-angle limit | Middle position | Telephoto limit |
|---|---|---|---|
| Object distance | 12.0192 | 12.0192 | 12.0192 |
| BF | 0.00051 | 0.00045 | 0.00102 |
| d6 | 2.0578 | 0.8132 | 0.0400 |
| d11 | 0.0691 | 0.1268 | 0.2995 |
| d13 | 0.1560 | 0.2258 | 0.2054 |
| d16 | 0.3198 | 0.1924 | 0.0400 |
| d21 | 0.2611 | 0.2493 | 0.3627 |
| d23 | 0.2403 | 0.7757 | 0.5667 |
| d25 | 0.5137 | 0.9420 | 1.0885 |

NUMERICAL EXAMPLE 2

The zoom lens system of Numerical Example 2 corresponds to Embodiment 2 shown in FIG. 5. Table 5 shows the surface data of the zoom lens system of Numerical Example 2. Table 6 shows the aspherical data. Table 7 shows various data in an infinity in-focus condition. Table 8 shows various data in a close-object in-focus condition.

TABLE 5

(Surface data)

| Surface number | r | d | nd | vd |
|---|---|---|---|---|
| Object surface | ∞ | | | |
| 1 | 16.22860 | 0.10020 | 1.71300 | 53.9 |
| 2 | 1.21350 | 0.47610 | | |
| 3* | −30.17970 | 0.08010 | 1.51760 | 63.5 |
| 4* | 4.22540 | 0.03560 | | |
| 5 | 6.26920 | 0.14240 | 1.84666 | 23.8 |
| 6 | −53.11030 | Variable | | |
| 7 | 2.37300 | 0.16110 | 1.80420 | 46.5 |
| 8 | −26.82470 | 0.00800 | | |
| 9 | 1.35360 | 0.04810 | 1.68893 | 31.2 |
| 10 | 0.87380 | 0.42900 | 1.59282 | 68.6 |
| 11 | −6.19660 | Variable | | |
| 12 | −4.35410 | 0.04010 | 1.71736 | 29.5 |
| 13 | 20.79190 | Variable | | |
| 14(Diaphragm) | ∞ | 0.08250 | | |
| 15* | −3.81490 | 0.04010 | 1.51760 | 63.5 |
| 16 | 1.79440 | Variable | | |
| 17 | 1.13170 | 0.03210 | 1.80518 | 25.5 |
| 18 | 0.76290 | 0.22380 | 1.59282 | 68.6 |
| 19 | −4.60080 | 0.00800 | | |
| 20* | 2.37330 | 0.04010 | 1.51760 | 63.5 |

TABLE 5-continued (Surface data)

| Surface number | r | d | nd | vd |
|---|---|---|---|---|
| 21 | 3.17580 | Variable | | |
| 22* | −72.21810 | 0.04010 | 1.80998 | 40.9 |
| 23* | 1.37710 | Variable | | |
| 24 | 2.88560 | 0.13670 | 1.84666 | 23.8 |
| 25 | −88.34220 | Variable | | |
| 26 | ∞ | (BF) | | |
| Image surface | ∞ | | | |

TABLE 6

(Aspherical data)

Surface No. 3

$K = 0.00000E+00, A4 = -1.15331E-01, A6 = 2.22733E-01,$
$A8 = -1.43103E-01\ A10 = 2.08479E-02$
Surface No. 4

$K = 0.00000E+00, A4 = -1.35636E-01, A6 = 2.19415E-01,$
$A8 = -1.57394E-01\ A10 = 1.68502E-02$
Surface No. 15

$K = 0.00000E+00, A4 = 7.41893E-02, A6 = -7.75996E-02,$
$A8 = 0.00000E+00\ A10 = 0.00000E+00$
Surface No. 20

$K = 0.00000E+00, A4 = -3.96630E-01, A6 = 3.54999E-01,$
$A8 = -3.13787E+00\ A10 = 7.09576E+00$
Surface No. 22

$K = 0.00000E+00, A4 = -2.98026E-01, A6 = 7.76880E-02,$
$A8 = 0.00000E+00\ A10 = 0.00000E+00$
Surface No. 23

$K = 0.00000E+00, A4 = -2.94430E-01, A6 = 7.02350E-02,$
$A8 = 7.07732E-01\ A10 = -1.57609E+00$

TABLE 7

(Various data in an infinity in-focus condition)

Zooming ratio 2.70833

| | Wide-angle limit | Middle position | Telephoto limit |
|---|---|---|---|
| Focal length | 1.0001 | 1.6453 | 2.7085 |
| F-number | 2.91440 | 2.91344 | 2.91481 |
| Half view angle | 43.9743 | 27.8205 | 17.3804 |
| Image height | 0.8670 | 0.8670 | 0.8670 |
| Overall length of lens system | 6.0469 | 5.0222 | 4.9204 |
| BF | 0.00012 | 0.00033 | 0.00019 |
| d6 | 2.2573 | 0.8438 | 0.0801 |
| d11 | 0.0836 | 0.1461 | 0.3631 |
| d13 | 0.1236 | 0.2107 | 0.1393 |
| d16 | 0.3353 | 0.1856 | 0.0400 |
| d21 | 0.1432 | 0.1055 | 0.1189 |
| d23 | 0.4669 | 0.4093 | 0.8854 |
| d25 | 0.5128 | 0.9968 | 1.1693 |

Zoom lens unit data

| Lens unit | Initial surface No. | Focal length |
|---|---|---|
| 1 | 1 | −1.91397 |
| 2 | 7 | 1.20912 |
| 3 | 12 | −5.01530 |

TABLE 7-continued (Various data in an infinity in-focus condition)

| 4 | 14 | −2.35203 |
|---|---|---|
| 5 | 17 | 1.63932 |
| 6 | 22 | −1.66795 |
| 7 | 24 | 3.30267 |

TABLE 8

(Various data in a close-object in-focus condition)

| | Wide-angle limit | Middle position | Telephoto limit |
|---|---|---|---|
| Object distance | 12.0192 | 12.0192 | 12.0192 |
| BF | 0.00032 | 0.00008 | 0.00055 |
| d6 | 2.2573 | 0.8438 | 0.0801 |
| d11 | 0.0567 | 0.0859 | 0.2895 |
| d13 | 0.1504 | 0.2710 | 0.7129 |
| d16 | 0.3353 | 0.1856 | 0.0400 |
| d21 | 0.2267 | 0.2787 | 0.4277 |
| d23 | 0.3834 | 0.2361 | 0.5765 |
| d25 | 0.5128 | 0.9968 | 1.1693 |

NUMERICAL EXAMPLE 3

The zoom lens system of Numerical Example 3 corresponds to Embodiment 3 shown in FIG. 9. Table 9 shows the surface data of the zoom lens system of Numerical Example 3. Table 10 shows the aspherical data. Table 11 shows various data in an infinity in-focus condition. Table 12 shows various data in a close-object in-focus condition.

TABLE 9

(Surface data)

| Surface number | r | d | nd | vd |
|---|---|---|---|---|
| Object surface | ∞ | | | |
| 1 | 16.01480 | 0.10020 | 1.71300 | 53.9 |
| 2 | 1.12100 | 0.44710 | | |
| 3* | 8.91830 | 0.08010 | 1.51760 | 63.5 |
| 4* | 3.11580 | 0.00800 | | |
| 5 | 2.45620 | 0.15130 | 1.84666 | 23.8 |
| 6 | 4.62660 | Variable | | |
| 7 | 1.94380 | 0.16250 | 1.80420 | 46.5 |
| 8 | 15.95330 | 0.00800 | | |
| 9 | 1.24990 | 0.04810 | 1.68893 | 31.2 |
| 10 | 0.76720 | 0.48800 | 1.59282 | 68.6 |
| 11 | −5.08410 | Variable | | |
| 12 | −3.08620 | 0.04010 | 1.71736 | 29.5 |
| 13 | 6.87940 | Variable | | |
| 14(Diaphragm) | ∞ | 0.08010 | | |
| 15* | −4.59970 | 0.04010 | 1.51760 | 63.5 |
| 16 | 1.69610 | Variable | | |
| 17 | 0.90880 | 0.03210 | 1.80518 | 25.5 |
| 18 | 0.80970 | 0.21070 | 1.59282 | 68.6 |
| 19 | −3.42900 | 0.00800 | | |
| 20* | 3.55610 | 0.04010 | 1.51760 | 63.5 |
| 21 | 16.12910 | Variable | | |
| 22* | −4.16980 | 0.04010 | 1.80998 | 40.9 |
| 23* | 1.39970 | Variable | | |
| 24 | 2.20800 | 0.12630 | 1.84666 | 23.8 |
| 25 | 6.22990 | Variable | | |
| 26 | ∞ | (BF) | | |
| Image surface | ∞ | | | |

TABLE 10

(Aspherical data)

Surface No. 3

K = 0.00000E+00, A4 = −1.39591E−01,
A6 = 1.57113E−01, A8 = 6.10397E−02
A10 = −9.55628E−02
Surface No. 4

K = 0.00000E+00, A4 = −1.53839E−01,
A6 = 1.48948E−01, A8 = 6.98606E−02
A10 = −1.32010E−01
Surface No. 15

K = 0.00000E+00, A4 = 4.91866E−02,
A6 = −8.74159E−03, A8 = 0.00000E+00
A10 = 0.00000E+00
Surface No. 20

K = 0.00000E+00, A4 = −5.99569E−01,
A6 = 1.18464E−02, A8 = −5.03098E−01
A10 = 3.39957E+00
Surface No. 22

K = 0.00000E+00, A4 = −4.12730E−01,
A6 = 2.39373E−01, A8 = 0.00000E+00
A10 = 0.00000E+00
Surface No. 23

K = 0.00000E+00, A4 = −4.09324E−01,
A6 = 5.41195E−01, A8 = 1.95838E−01
A10 = 8.81046E−01

TABLE 11

(Various data in an infinity in-focus condition)

Zooming ratio 2.70869

|  | Wide-angle limit | Middle position | Telephoto limit |
|---|---|---|---|
| Focal length | 1.0000 | 1.6460 | 2.7087 |
| F-number | 2.91421 | 2.91427 | 2.91443 |
| Half view angle | 43.7626 | 28.2151 | 17.6726 |
| Image height | 0.8670 | 0.8670 | 0.8670 |
| Overall length of lens system | 5.2062 | 4.6563 | 4.6431 |
| BF | 0.00020 | 0.00059 | 0.00075 |
| d6 | 1.7146 | 0.7206 | 0.0400 |
| d11 | 0.0921 | 0.1791 | 0.3223 |
| d13 | 0.2195 | 0.2059 | 0.1351 |
| d16 | 0.1858 | 0.1124 | 0.0400 |
| d21 | 0.2335 | 0.1224 | 0.1013 |
| d23 | 0.3363 | 0.3879 | 0.6523 |
| d25 | 0.3133 | 0.8165 | 1.2404 |

Zoom lens unit data

| Lens unit | Initial surface No. | Focal length |
|---|---|---|
| 1 | 1 | −1.90230 |
| 2 | 7 | 1.16500 |
| 3 | 12 | −2.96486 |
| 4 | 14 | −2.38888 |
| 5 | 17 | 1.12871 |
| 6 | 22 | −1.28962 |
| 7 | 24 | 3.98226 |

TABLE 12

(Various data in a close-object in-focus condition)

|  | Wide-angle limit | Middle position | Telephoto limit |
|---|---|---|---|
| Object distance | 12.0192 | 12.0192 | 12.0192 |
| BF | 0.00037 | 0.00053 | 0.00061 |
| d6 | 1.7146 | 0.7206 | 0.0400 |

TABLE 12-continued (Various data in a close-object in-focus condition)

|  | Wide-angle limit | Middle position | Telephoto limit |
|---|---|---|---|
| d11 | 0.0615 | 0.1121 | 0.2294 |
| d13 | 0.2501 | 0.2729 | 0.2280 |
| d16 | 0.1858 | 0.1124 | 0.0400 |
| d21 | 0.3294 | 0.2699 | 0.3316 |
| d23 | 0.2403 | 0.2404 | 0.4221 |
| d25 | 0.3133 | 0.8165 | 1.2404 |

NUMERICAL EXAMPLE 4

The zoom lens system of Numerical Example 4 corresponds to Embodiment 4 shown in FIG. 13. Table 13 shows the surface data of the zoom lens system of Numerical Example 4. Table 14 shows the aspherical data. Table 15 shows various data in an infinity in-focus condition. Table 16 shows various data in a close-object in-focus condition.

TABLE 13

(Surface data)

| Surface number | r | d | nd | vd |
|---|---|---|---|---|
| Object surface | ∞ |  |  |  |
| 1 | 16.43680 | 0.10020 | 1.83481 | 42.7 |
| 2 | 1.28440 | 0.30650 |  |  |
| 3* | 4.72090 | 0.10020 | 1.58313 | 59.4 |
| 4* | 3.00340 | 0.00800 |  |  |
| 5 | 2.12390 | 0.18100 | 1.84666 | 23.8 |
| 6 | 4.12330 | Variable |  |  |
| 7 | 1.37400 | 0.05210 | 1.67270 | 32.2 |
| 8 | 0.79370 | 0.43100 | 1.77200 | 50.0 |
| 9* | −40.06400 | Variable |  |  |
| 10* | 1.38250 | 0.08310 | 1.77200 | 50.0 |
| 11 | 2.62260 | Variable |  |  |
| 12(Diaphragm) | ∞ | 0.08010 |  |  |
| 13 | −24.71420 | 0.04010 | 1.60342 | 38.0 |
| 14 | 1.92420 | 0.10530 |  |  |
| 15 | −1.79480 | 0.03210 | 1.69895 | 30.0 |
| 16 | 15.21320 | Variable |  |  |
| 17 | 1.31000 | 0.03610 | 1.78472 | 25.7 |
| 18 | 0.71790 | 0.36790 | 1.58313 | 59.4 |
| 19* | −1.83300 | Variable |  |  |
| 20 | −2.92680 | 0.04810 | 1.59270 | 35.4 |
| 21 | 2.54300 | Variable |  |  |
| 22 | 2.14330 | 0.18570 | 1.84666 | 23.8 |
| 23 | −12.51830 | 0.05210 | 1.48749 | 70.4 |
| 24 | 3.64800 | Variable |  |  |
| 25 | ∞ | (BF) |  |  |
| Image surface | ∞ |  |  |  |

TABLE 14

(Aspherical data)

Surface No. 3

K = 0.00000E+00, A4 = 2.42035E−02,
A6 = 7.44153E−02, A8 = −4.30332E−02
A10 = −1.13879E−03
Surface No. 4

K = 0.00000E+00, A4 = 7.73188E−03,
A6 = 6.68336E−02, A8 = −4.68056E−02
A10 = −1.19404E−02
Surface No. 9

K = 0.00000E+00, A4 = −1.07972E−01,
A6 = 2.98068E−01, A8 = −4.62652E−01
A10 = 3.30822E−01

TABLE 14-continued (Aspherical data)

Surface No. 10

K = 0.00000E+00, A4 = −1.74829E−01,
A6 = 1.69998E−01, A8 = −3.37080E−01
A10 = −2.25265E−01

Surface No. 19

K = 0.00000E+00, A4 = 3.25272E−01,
A6 = 1.15110E−01, A8 = 0.00000E+00
A10 = 0.00000E+00

TABLE 15

(Various data in an infinity in-focus condition)

Zooming ratio 2.63627

|  | Wide-angle limit | Middle position | Telephoto limit |
|---|---|---|---|
| Focal length | 1.0000 | 1.6197 | 2.6364 |
| F-number | 2.91640 | 2.91698 | 2.91906 |
| Half view angle | 44.0564 | 28.3783 | 17.9772 |
| Image height | 0.8670 | 0.8670 | 0.8670 |
| Overall length of lens system | 5.6621 | 4.8104 | 4.4475 |
| BF | 0.00030 | 0.00041 | 0.00044 |
| d6 | 2.1595 | 0.8889 | 0.0200 |
| d9 | 0.0932 | 0.0946 | 0.0838 |
| d11 | 0.1452 | 0.2191 | 0.3906 |
| d16 | 0.2123 | 0.1522 | 0.0200 |
| d19 | 0.2699 | 0.0801 | 0.0801 |
| d21 | 0.1746 | 0.3343 | 0.6112 |
| d24 | 0.3975 | 0.8312 | 1.0318 |

Zoom lens unit data

| Lens unit | Initial surface No. | Focal length |
|---|---|---|
| 1 | 1 | −2.19482 |
| 2 | 7 | 1.59009 |
| 3 | 10 | 3.67983 |
| 4 | 12 | −1.26584 |
| 5 | 17 | 1.63369 |
| 6 | 20 | −2.28829 |
| 7 | 22 | 3.37570 |

TABLE 16

(Various data in a close-object in-focus condition)

|  | Wide-angle limit | Middle position | Telephoto limit |
|---|---|---|---|
| Object distance | 12.0192 | 12.0192 | 12.0192 |
| BF | 0.00028 | 0.00057 | 0.00035 |
| d6 | 2.1595 | 0.8889 | 0.0200 |
| d9 | 0.0769 | 0.0662 | 0.0428 |
| d11 | 0.1615 | 0.2475 | 0.4317 |
| d16 | 0.2123 | 0.1522 | 0.0200 |
| d19 | 0.3675 | 0.2426 | 0.4790 |
| d21 | 0.0770 | 0.1717 | 0.2122 |
| d24 | 0.3975 | 0.8312 | 1.0318 |

NUMERICAL EXAMPLE 5

The zoom lens system of Numerical Example 5 corresponds to Embodiment 5 shown in FIG. 17. Table 17 shows the surface data of the zoom lens system of Numerical Example 5. Table 18 shows the aspherical data. Table 19 shows various data in an infinity in-focus condition. Table 20 shows various data in a close-object in-focus condition.

TABLE 17

(Surface data)

| Surface number | r | d | nd | vd |
|---|---|---|---|---|
| Object surface | ∞ | | | |
| 1 | 16.42650 | 0.10020 | 1.83481 | 42.7 |
| 2 | 1.29180 | 0.33990 | | |
| 3* | 6.66430 | 0.10020 | 1.58313 | 59.4 |
| 4* | 3.69040 | 0.00800 | | |
| 5 | 2.44400 | 0.17400 | 1.84666 | 23.8 |
| 6 | 5.22310 | Variable | | |
| 7 | 1.37400 | 0.05210 | 1.67270 | 32.2 |
| 8 | 0.80780 | 0.48080 | 1.77200 | 50.0 |
| 9* | −40.06410 | Variable | | |
| 10* | 1.39510 | 0.08300 | 1.77200 | 50.0 |
| 11 | 2.64180 | Variable | | |
| 12(Diaphragm) | ∞ | Variable | | |
| 13 | −27.37250 | 0.04010 | 1.60342 | 38.0 |
| 14 | 1.93140 | 0.10380 | | |
| 15 | −1.94630 | 0.03210 | 1.69895 | 30.0 |
| 16 | 7.61470 | Variable | | |
| 17 | 1.28430 | 0.03610 | 1.78472 | 25.7 |
| 18 | 0.71090 | 0.38300 | 1.58313 | 59.4 |
| 19* | −1.92090 | Variable | | |
| 20 | −2.68460 | 0.04810 | 1.59270 | 35.4 |
| 21 | 2.79150 | Variable | | |
| 22 | 2.20530 | 0.18300 | 1.84666 | 23.8 |
| 23 | −14.19060 | 0.05210 | 1.48749 | 70.4 |
| 24 | 4.57690 | Variable | | |
| 25 | ∞ | (BF) | | |
| Image surface | ∞ | | | |

TABLE 18

(Aspherical data)

Surface No. 3

K = 0.00000E+00, A4 = 2.50479E−02,
A6 = 6.12492E−02, A8 = −3.84181E−02
A10 = −4.91389E−03

Surface No. 4

K = 0.00000E+00, A4 = 7.37643E−03,
A6 = 5.12892E−02, A8 = −4.28898E−02
A10 = −1.27898E−02

Surface No. 9

K = 0.00000E+00, A4 = −9.96718E−02,
A6 = 2.89126E−01, A8 = −4.80192E−01
A10 = 3.80299E−01

Surface No. 10

K = 0.00000E+00, A4 = −1.69760E−01,
A6 = 1.75140E−01, A8 = −4.60340E−01
A10 = 1.46800E−02

Surface No. 19

K = 0.00000E+00, A4 = 3.11961E−01,
A6 = 1.06644E−01, A8 = 0.00000E+00
A10 = 0.00000E+00

TABLE 19

(Various data in an infinity in-focus condition)

Zooming ratio 2.63632

|  | Wide-angle limit | Middle position | Telephoto limit |
|---|---|---|---|
| Focal length | 1.0000 | 1.6197 | 2.6364 |
| F-number | 2.91720 | 2.92008 | 2.91580 |
| Half view angle | 44.0539 | 28.4212 | 18.0241 |
| Image height | 0.8670 | 0.8670 | 0.8670 |
| Overall length of lens system | 5.7624 | 4.8692 | 4.5678 |

TABLE 19-continued (Various data in an infinity in-focus condition)

| | | | |
|---|---|---|---|
| BF | 0.00050 | 0.00049 | 0.00057 |
| d6 | 2.1799 | 0.8724 | 0.0200 |
| d9 | 0.0899 | 0.0899 | 0.0899 |
| d11 | 0.1452 | 0.2243 | 0.3054 |
| d12 | 0.0801 | 0.0801 | 0.1625 |
| d16 | 0.2035 | 0.1487 | 0.0200 |
| d19 | 0.2839 | 0.1016 | 0.0801 |
| d21 | 0.1791 | 0.3129 | 0.6264 |
| d24 | 0.3849 | 0.8234 | 1.0475 |

Zoom lens unit data

| Lens unit | Initial surface No. | Focal length |
|---|---|---|
| 1 | 1 | −2.17753 |
| 2 | 7 | 1.59636 |
| 3 | 10 | 3.72143 |
| 4 | 13 | −1.24582 |
| 5 | 17 | 1.64894 |
| 6 | 20 | −2.30140 |
| 7 | 22 | 3.25378 |

TABLE 20

(Various data in a close-object in-focus condition)

| | Wide-angle limit | Middle position | Telephoto limit |
|---|---|---|---|
| Object distance | 12.0192 | 12.0192 | 12.0192 |
| BF | 0.00023 | 0.00041 | 0.00057 |
| d6 | 2.1799 | 0.8724 | 0.0200 |
| d9 | 0.0733 | 0.0613 | 0.0494 |
| d11 | 0.1608 | 0.2519 | 0.3448 |
| d12 | 0.0801 | 0.0801 | 0.1625 |
| d16 | 0.2035 | 0.1487 | 0.0200 |
| d19 | 0.3854 | 0.2731 | 0.4840 |
| d21 | 0.0777 | 0.1413 | 0.2225 |
| d24 | 0.3849 | 0.8234 | 1.0475 |

NUMERICAL EXAMPLE 6

The zoom lens system of Numerical Example 6 corresponds to Embodiment 6 shown in FIG. 21. Table 21 shows the surface data of the zoom lens system of Numerical Example 6. Table 22 shows the aspherical data. Table 23 shows various data in an infinity in-focus condition. Table 24 shows various data in a close-object in-focus condition.

TABLE 21

(Surface data)

| Surface number | r | d | nd | vd |
|---|---|---|---|---|
| Object surface | ∞ | | | |
| 1 | 13.17770 | 0.12020 | 1.77200 | 50.0 |
| 2* | 0.87840 | 0.91550 | | |
| 3* | −3.34040 | 0.09010 | 1.51760 | 63.5 |
| 4* | 4.31580 | 0.01200 | | |
| 5 | 3.12000 | 0.34670 | 1.90366 | 31.3 |
| 6 | −10.68320 | Variable | | |
| 7 | 2.31980 | 0.06010 | 1.84666 | 23.8 |
| 8 | 1.31730 | 0.36780 | 1.56732 | 42.8 |
| 9 | −161.97090 | Variable | | |
| 10 | 1.33190 | 0.39140 | 1.51680 | 64.2 |
| 11 | −69.02500 | Variable | | |
| 12(Diaphragm) | ∞ | Variable | | |
| 13* | −9.97550 | 0.06010 | 1.80998 | 40.9 |
| 14 | 1.78780 | 0.00600 | | |
| 15 | 1.41010 | 0.04210 | 1.83400 | 37.3 |
| 16 | 0.85310 | 0.27440 | 1.59282 | 68.6 |
| 17 | 3.89550 | 0.01200 | | |
| 18 | 2.12220 | 0.32800 | 1.59282 | 68.6 |
| 19 | −1.55450 | Variable | | |
| 20 | 4.83020 | 0.06010 | 1.74330 | 49.2 |
| 21 | 1.43630 | Variable | | |
| 22 | −6.00960 | 0.19380 | 1.80998 | 40.9 |
| 23* | −3.12580 | Variable | | |
| 24 | ∞ | (BF) | | |
| Image surface | ∞ | | | |

TABLE 22

(Aspherical data)

Surface No. 2

K = −5.19121E−01, A4 = −3.34982E−02,
A6 = 9.91391E−04, A8 = −7.38152E−03
A10 = −5.29414E−03

Surface No. 3

K = 0.00000E+00, A4 = 2.80237E−02,
A6 = −4.09477E−02, A8 = 2.20136E−02
A10 = −8.57158E−03

Surface No. 4

K = 0.00000E+00, A4 = 2.53058E−02,
A6 = −5.53018E−02, A8 = 3.19224E−02
A10 = −1.08455E−02

Surface No. 13

K = 0.00000E+00, A4 = −1.85807E−01,
A6 = −5.54870E−02, A8 = −2.45840E−02
A10 = 9.73712E−02

Surface No. 23

K = 0.00000E+00, A4 = 1.23455E−02,
A6 = −1.22792E−02, A8 = 4.84349E−03
A10 = −1.28830E−03

TABLE 23

(Various data in an infinity in-focus condition)

Zooming ratio 2.01931

| | Wide-angle limit | Middle position | Telephoto limit |
|---|---|---|---|
| Focal length | 1.0000 | 1.4205 | 2.0194 |
| F-number | 2.91225 | 2.91234 | 2.91549 |
| Half view angle | 55.6018 | 42.7684 | 32.7645 |
| Image height | 1.3000 | 1.3000 | 1.3000 |
| Overall length of lens system | 7.7383 | 6.7911 | 6.9097 |
| BF | 0.00032 | 0.00046 | 0.00066 |
| d6 | 1.3032 | 0.4841 | 0.0390 |
| d9 | 0.8892 | 0.2433 | 0.0270 |
| d11 | 0.1223 | 0.5537 | 0.5782 |
| d12 | 0.6116 | 0.1802 | 0.1557 |
| d19 | 0.0961 | 0.1054 | 0.0962 |
| d21 | 0.4968 | 0.7394 | 1.7822 |
| d23 | 0.9385 | 1.2042 | 0.9504 |

Zoom lens unit data

| Lens unit | Initial surface No. | Focal length |
|---|---|---|
| 1 | 1 | −1.64109 |
| 2 | 7 | 6.29854 |
| 3 | 10 | 2.53323 |
| 4 | 13 | 3.16326 |

TABLE 23-continued (Various data in an infinity in-focus condition)

| | | |
|---|---|---|
| 5 | 20 | −2.77102 |
| 6 | 22 | 7.80728 |

TABLE 24

(Various data in a close-object in-focus condition)

| | Wide-angle limit | Middle position | Telephoto limit |
|---|---|---|---|
| Object distance | 12.0192 | 12.0192 | 12.0192 |
| BF | 0.00033 | 0.00029 | 0.00050 |
| d6 | 1.3032 | 0.4841 | 0.0390 |
| d9 | 0.8892 | 0.2433 | 0.0270 |
| d11 | 0.1223 | 0.5537 | 0.5782 |
| d12 | 0.6116 | 0.1802 | 0.1557 |
| d19 | 0.1605 | 0.2025 | 0.2241 |
| d21 | 0.4324 | 0.6424 | 1.6544 |
| d23 | 0.9385 | 1.2042 | 0.9504 |

The following Table 25 shows the corresponding values to the individual conditions in the zoom lens systems of each of Numerical Examples.

TABLE 25

(Values corresponding to conditions)

| Condition | Numerical Example | | | | | |
|---|---|---|---|---|---|---|
| | 1 | 2 | 3 | 4 | 5 | 6 |
| (1) $L_{SW}/\{f_T \times \tan(\omega_T)\}$ | 2.28 | 2.43 | 1.91 | 2.34 | 2.34 | 2.40 |
| (2) $L_{G1G2}/f_W$ | 2.06 | 2.26 | 1.71 | 2.16 | 2.18 | 1.30 |
| (3) $|f_{G1}/f_W|$ | 2.01 | 1.91 | 1.90 | 2.19 | 2.18 | 1.64 |
| (4) $f_{G2}/f_W$ | 1.24 | 1.21 | 1.17 | 1.59 | 1.60 | 6.30 |
| (5) $f_{GM}/f_W$ | 3.21 | 3.30 | 3.98 | 3.38 | 3.25 | 7.81 |
| (6) $(R2_{L1}+R1_{L1})/(R2_{L1}-R1_{L1})$ | −1.16 | −1.16 | −1.15 | −1.17 | −1.17 | −1.14 |
| (7) $|f_{F1}/f_W|$ | 1.33 | 1.67 | 1.29 | 2.29 | 2.30 | 2.77 |

The present disclosure is applicable to a digital still camera, a digital video camera, a camera for a mobile terminal device such as a smart-phone, a camera for a PDA (Personal Digital Assistance), a surveillance camera in a surveillance system, a Web camera, a vehicle-mounted camera or the like. In particular, the present disclosure is applicable to a photographing optical system where high image quality is required like in a digital still camera system or a digital video camera system.

Also, the present disclosure is applicable to, among the interchangeable lens apparatuses according to the present disclosure, an interchangeable lens apparatus having motorized zoom function, i.e., activating function for the zoom lens system by a motor, with which a digital video camera system is provided.

As described above, embodiments have been described as examples of art in the present disclosure. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of the art in the present disclosure, it is understood that various modifications, replacements, additions, omissions, and the like can be performed in the scope of the claims or in an equivalent scope thereof.

What is claimed is:

1. A zoom lens system having a plurality of lens units, each lens unit comprising at least one lens element,
the zoom lens system, in order from an object side to an image side, comprising:
a first lens unit having negative optical power, and including at least one lens element having positive optical power;
a second lens unit having positive optical power, and including at least one lens element having negative optical power; and
subsequent lens units including an aperture diaphragm, wherein
the subsequent lens units include a most image side lens unit provided closest to the image side, the most image side lens unit being fixed with respect to an image surface in focusing from an infinity in-focus condition to a close-object in-focus condition,
a first focusing lens unit that moves along an optical axis in the focusing is provided between the aperture diaphragm and the most image side lens unit, and
the following conditions (1) and (2) are satisfied:

$$1.0 < L_{SW}/\{f_T \times \tan(\omega_T)\} < 2.6 \quad (1)$$

$$0.8 < L_{G1G2}/f_W < 2.8 \quad (2)$$

where
$L_{SW}$ is an axial distance from the aperture diaphragm to the image surface at a wide-angle limit in an infinity in-focus condition,
$f_T$ is a focal length of the zoom lens system at a telephoto limit in the infinity in-focus condition,
$\omega_T$ is a half view angle of the zoom lens system at the telephoto limit in the infinity in-focus condition,
$L_{G1G2}$ is an axial distance between a most image side lens element in the first lens unit and a most object side lens element in the second lens unit at the wide-angle limit in the infinity in-focus condition, and
$f_W$ is a focal length of the zoom lens system at the wide-angle limit in the infinity in-focus condition, wherein
the first lens unit, in order from the object side to the image side, comprises: a first lens element having negative optical power; a second lens element having negative optical power; and a third lens element having positive optical power, and
the following condition (6) is satisfied:

$$-2.5 < (R2_{L1}+R1_{L1})/(R2_{L1}-R1_{L1}) < -0.9; \quad (6)$$

where
$R1_{L1}$ is a radius of curvature of an object side surface of the first lens element, and
$R2_{L1}$ is a radius of curvature of an image side surface of the first lens element.

2. The zoom lens system as claimed in claim 1, wherein the following condition (3) is satisfied:

$$1.3 < |f_{G1}/f_W| < 2.5 \quad (3)$$

where
$f_{G1}$ is a focal length of the first lens unit.

3. The zoom lens system as claimed in claim 1, wherein the following condition (4) is satisfied:

$$1.0 < f_{G2}/f_W < 10.0 \quad (4)$$

where
$f_{G2}$ is a focal length of the second lens unit.

4. The zoom lens system as claimed in claim 1, wherein the most image side lens unit has positive optical power, and
the following condition (5) is satisfied:

$$2.0 < f_{GMI}/f_W < 12.0 \quad (5)$$

where
$f_{GMI}$ is a focal length of the most image side lens unit.

5. The zoom lens system as claimed in claim 1, wherein the second lens element has at least one aspheric surface.

6. The zoom lens system as claimed in claim 1, wherein the first focusing lens unit has negative optical power, and the following condition (7) is satisfied:

$$1.0 < |f_{F1}/f_W| < 3.0 \quad (7)$$

where
$f_{F1}$ is a focal length of the most image side lens unit.

7. The zoom lens system as claimed in claim 1, wherein a part or an entirety of a lens unit provided adjacent to the object side of the aperture diaphragm is a second focusing lens unit that moves along the optical axis in the focusing.

8. An interchangeable lens apparatus comprising:
the zoom lens system as claimed in claim 1; and
a lens mount section which is connectable to a camera body including an image sensor for receiving an optical image formed by the zoom lens system and converting the optical image into an electric image signal.

9. A camera system comprising:
an interchangeable lens apparatus including the zoom lens system as claimed in claim 1; and
a camera body which is detachably connected to the interchangeable lens apparatus via a camera mount section, and includes an image sensor for receiving an optical image formed by the zoom lens system and converting the optical image into an electric image signal.

\* \* \* \* \*